(12) United States Patent
Wei

(10) Patent No.: US 7,761,878 B2
(45) Date of Patent: Jul. 20, 2010

(54) SYSTEM AND METHOD FOR STATEFUL WEB-BASED COMPUTING

(75) Inventor: Coach K. Wei, Boston, MA (US)

(73) Assignee: Nexaweb Technologies, Inc, Burlington, MA (US)

( * ) Notice: Subject to any disclaimer, the term of this patent is extended or adjusted under 35 U.S.C. 154(b) by 1444 days.

(21) Appl. No.: 11/076,518

(22) Filed: Mar. 8, 2005

(65) Prior Publication Data

US 2005/0198365 A1    Sep. 8, 2005

Related U.S. Application Data

(63) Continuation-in-part of application No. 10/717,784, filed on Nov. 19, 2003, now Pat. No. 6,886,169.

(51) Int. Cl.
G06F 9/44       (2006.01)
G06F 15/16      (2006.01)

(52) U.S. Cl. ......................... 719/314; 709/203

(58) Field of Classification Search ................. 719/310, 719/314; 709/203, 206, 207, 224, 232
See application file for complete search history.

(56) References Cited

U.S. PATENT DOCUMENTS

| | | | | |
|---|---|---|---|---|
| 5,577,211 A * | 11/1996 | Annapareddy et al. | ...... | 709/232 |
| 5,797,005 A * | 8/1998 | Bahls et al. | ......... | 719/314 |
| 5,887,168 A * | 3/1999 | Bahls et al. | ......... | 719/314 |
| 6,687,735 B1 * | 2/2004 | Logston et al. | ........... | 709/203 |
| 6,889,244 B1 * | 5/2005 | Gaither et al. | ............. | 709/202 |
| 7,127,507 B1 * | 10/2006 | Clark et al. | ............... | 709/224 |
| 7,162,512 B1 * | 1/2007 | Amit et al. | ................ | 709/206 |
| 7,185,034 B2 * | 2/2007 | Jain et al. | .................... | 707/206 |
| 7,249,163 B2 * | 7/2007 | Hickson et al. | ............. | 709/213 |
| 7,392,281 B1 * | 6/2008 | Kanojia et al. | ............... | 709/202 |
| 7,454,751 B2 * | 11/2008 | Sun et al. | ..................... | 718/101 |
| 2003/0041105 A1 * | 2/2003 | Patrick | ....................... | 709/203 |
| 2006/0129650 A1 * | 6/2006 | Ho et al. | ..................... | 709/207 |

OTHER PUBLICATIONS

Saha et al. "On Guaranteed Delivery of Time-Critical Messages in DQDB". 1994 IEEE, pp. 272-279.*
Balakrishnan et al. "Providing Message Delivery Guarantees in Pipelined Flit-Buffered Multiprocessor Networks", 1996 IEEE, pp. 120-129.*

(Continued)

*Primary Examiner*—Van H Nguyen
(74) *Attorney, Agent, or Firm*—AKC Patents LLC; Aliki K. Collins

(57) ABSTRACT

A method for providing "guaranteed message delivery" for network based communications between a client machine and a server. The client machine includes a Client Runtime Environment (CRE) and the server includes a Server Runtime Environment (SRE). The method includes the following steps. A first message queue is maintained in the CRE. A first unique identification is attached to the first message from the first message queue and the first message is sent from the CRE to the SRE via a network communication. The SRE receives the first message and sends an acknowledgement of the receipt of the first message to the CRE. Upon receiving of the acknowledgement within a certain time threshold, the CRE removes the first message from the first message queue in the CRE. A method of providing "server-push" of messages from the server to the client machine utilizing a push Servlet and a push API.

9 Claims, 16 Drawing Sheets

OTHER PUBLICATIONS

Andreula et al. "Creating an Open Systems Compatible Message Queueing System", 1994 IEEE, pp. 19-23.*

Dube et al. "Queueing Analysis of Early Message Discard Policy", 2002 IEEE, pp. 2426-2430.*

* cited by examiner

```
<xml>
<button id="btn1" text="This is a line of
Text" />
</xml>                            142
```

| button: Object | 144 |
|---|---|
| id: String ="btn1"<br>text: String="This is a line of Text" | |

```
<xml>
<button id="btn1" bgcolor="gray" />
</xml>                            146
```

| button: Object | 148 |
|---|---|
| id: String ="btn1"<br>bgcolor: Color =Color.gray | |

| button: Object | 154 |
|---|---|
| id: String ="btn1"<br>text: String="This is a line of Text" | |

This is a line of Text  ⌐150

| button: Object | 156 |
|---|---|
| id: String ="btn1"<br>bgcolor: Color =Color.gray | |

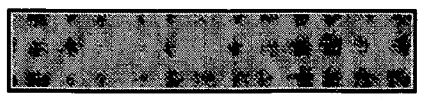
152

SYSTEM AND METHOD FOR STATEFUL WEB-BASED COMPUTING

CROSS REFERENCE TO RELATED CO-PENDING APPLICATION

This application is a continuation in part and claims the priority benefit of U.S. application Ser. No. 10/717,784, filed on Nov. 19, 2003 now U.S. Pat. No. 6,886,169, and entitled "SYSTEM AND METHOD FOR STATEFUL WEB COMPUTING", the contents of which application are expressly incorporated herein by reference.

FIELD OF THE INVENTION

The present invention relates to a system and a method for stateful web-based computing, and more particularly to distributed computing that provides reliable real-time bi-directional messaging, state maintenance, and synchronization for distributed applications in a web-based or wireless environment.

BACKGROUND OF THE INVENTION

The World Wide Web (www or web) provides a cost-effective way for enterprises to publish and distribute documents that are formatted in Hyper Text Markup Language (HTML). By publishing HTML documents in a centralized web server, enterprises can communicate with people all over the world via the ubiquitous public Internet and the universally available web browsers.

As the web grows, enterprises are looking beyond just using the web for delivering HTML documents. Enterprises and software vendors are looking to deliver business applications over the web and to perform distributed computing over the web. Distributed computing describes a type of computing in which different components and objects comprising an application can be located on different computers connected to a network. For example, a word processing application might consist of an editor component on one computer, a spell-checker object on a second computer, and a thesaurus on a third computer. In some distributed computing systems, each of the three computers could even be running a different operating system.

The web architecture could provide the same benefits for business applications as it does for web documents. These benefits include:
a) Centralized management: applications and documents can be centrally managed on the server side, giving enterprises great control of security, business logic and data.
b) Centralized deployment: enterprises do not need to touch thousands of client computers to update applications and documents, i.e., changes on the server can instantly reach all users.
c) Universal delivery: applications and documents can reside in a central server and can be delivered to any client computer that has a web browser and an Internet connection, both of which are universally available.

However, the web was originally designed for browsing linked documents and not for delivering business applications. Referring to FIG. 1, the web infrastructure 100 includes an application server 105 for running application code 106, a web server 110 that delivers HTML documents generated by the application code 106, and a web browser 130 residing in a client machine 120 and displaying HTML documents in a "click and refresh" fashion. Application code 106 is usually written using a programming language including among others C, C++, C#, Java, Javascript, VBScript, ActionScript, VisualBasic or some proprietary language. The web browser 130 communicates with the web server 110 via a request/respond communication model 140. In this request/respond communication model 140 a user places a request for a specific web page through the web browser 130 and the web browser 130 sends the request to the web server 110 using a Hyper Text Transfer Protocol (HTTP) (142). The web server 110 receives the request and transfers it to the application server 105. In the application server 105 the application code 106 processes the request and generate a response that comprises HTML documents. Next, the web server 110 responds to the request by sending the generated HTML documents to the web browser 130 (144). This web infrastructure 100 is "stateless", i.e., neither the web server 110 nor the web browser 130 maintains the state of the application. The state of an application is a snapshot of all the program objects, variables and resources at each particular moment, the value of the variables, the relationship between different program objects, and the conditions of different resources. The state of an application changes and evolves as the application runs. For example, when a user is shopping at the website of Amazon.com, the state of the shopping application includes information including among others the current user name, number of items in the shopping cart and price of each item.

As was mentioned above, in the web infrastructure 100 of FIG. 1 the state of the application is not maintained either the client machine 120 or the web server 110. The client machine 120 merely displays HTML documents and only maintains the state information of the current documents. When a new document is loaded, the state information of the previous document is discarded and replaced by the new document's state information. State information of the previous document is lost For example, referring to FIG. 1A, a first markup document 142, page1.xml, contains code that will display in the client machine 120 a button 150 with text "This is a line of Text". A second markup document 146, page2.xml, contains code that will change the button's 150 background color to be gray, shown as button 152. The corresponding object oriented representations 144, 148 of the first and second markup documents 142, 146, respectively, are also shown in FIG. 1A. When the client machine 120 downloads the first markup document 142, the text "This is a line of Text" 150 is displayed in the client machine 120. The application state at this moment, shown as 154, contains all the information of the first markup document 142. Following the display of the first markup document 142, the client machine 120 downloads the second markup document 146, whereby the application state at this moment, shown as 156, discards the state of the first markup document 142 and contains the state of the second markup document only. As a result, the client machine displays a blank gray button 152 wherein the text "This is a line of Text" is gone even though button 152 is still the same button as button 150.

This "stateless" nature of today's web infrastructure 100 has limited the applicability of the web for delivering business application. Business applications are inherently "stateful". For example, the response to a user's click typically depends not only on what the user clicked, but also on the state of the application, such as the history of the user's interactions, the value of a form, or even the network connectivity. Software developers today have to write an extensive amount of code to maintain such state information on the server side, typically inside an application server. The application code needs to deal not only with how to generate responses to client requests but also with how to maintain and manage the application state. In the web infrastructure 100 of FIG. 1, the state of an application is maintained by application code running inside the application server 105. Such extensive work required for maintaining application state on the server side. This increases both the development cost and the application maintenance cost.

Furthermore, an entire new markup document has to be sent to the client machine upon every request/response, even if the new markup document contains only small changes to the previous markup document. A typical markup document can have a size of 10 kilobytes to several hundred kilobytes. Transmitting such documents consumes a lot of network bandwidth and slows down the application responsiveness.

Another problem for the delivery of business applications over the current "stateless" web infrastructure is the fact that network connections may not always be available. Because no state is maintained on the client-side, web applications built on the current infrastructure are unavailable if the network connection is not available. This possibility of a "down time" is not acceptable for business applications. As a result, developers have to write client and/or server applications to support such offline operation capabilities.

The "stateless" Hyper Text Transfer Protocol (HTTP) request/response model 140 does not enable real-time, bi-directional two way communications. This HTTP communication model 140 supports only "client pull" communications, in which the user has to send a request to the server in order to get new data. A lot of business applications require "stateful" connections that are persistent, through which the web server can send real-time data updates to different client machines, i.e., a "server push" model. For example, a stock portfolio management application requires real time stock data. Whenever the stock price changes, the user needs to receive the new price immediately. As a result, developers have to write a lot of code to enable "server push", where firewall issues and other security related issues are very challenging and expensive to deal with. In summary, the challenges of enabling bi-directional communications over the Internet are three folds:

a) The Internet as network infrastructure is capable of transmitting any kind of messages. However, a lot of enterprise environments allow only HTTP traffic due to security concerns. So if the messages are not transmitted via the HTTP protocol, such messages may not be able to reach the destination due to various firewall policies.

b) HTTP is designed to function as one-way, request/response model from a web browser to a web server. A web browser will open a connection to an HTTP web server through which it sends the request. The HTTP web server responds to this request, sends the response back to the web browser, and then closes the connection. Though HTTP 1.1 added features like "Keep-Alive" that can make the connection open for a period of time during which multiple request/response pairs can be transported through the same connection, this feature is not universally supported by all web browsers or web servers. Even if it is supported by the web browser and the HTTP web server, this "Keep-Alive" connection is only available to the HTTP web server internally for sending responses to client requests. Application code running inside an application server can not use this connection for doing "server push".

c) To enable bi-directional communications over HTTP, there are various HTTP tunneling techniques available. They typically require specially built client or server software for maintaining the persistent connection, through which messages are wrapped inside the HTTP protocol for transport purpose. Such techniques introduce extra costs and potential security problems. For example, they typically require extra server software that accepts and manages persistent connections through a port other than the standard HTTP server port (port 80). This breaks the server side firewall and has significant potential security risks.

There is no current method that can provide reliable "server push" capability to application code running inside a standard application server without changing client side or server side configurations.

Furthermore, the HTTP communication model is unreliable because messages can get lost due to various network problems. HTTP does not have a way to guarantee message delivery. Losing messages may be acceptable for web browsing but unacceptable for running business applications. As a result, enterprises have to spend a lot of extra resources to solve this problem for their important applications.

Accordingly, there is a need for a distributed computing system that provides a "stateful" web-based delivery of business applications, reliable bi-directional communications over HTTP and reliable "server-push" capabilities.

SUMMARY OF THE INVENTION

In general, in one aspect, the invention features a method for providing "guaranteed message delivery" for network based communications between a client machine and a server. The client machine includes a Client Runtime Environment (CRE) and the server includes a Server Runtime Environment (SRE). The method includes the following steps. A first message queue is maintained in the CRE. A first unique identification is attached to the first message from the first message queue and the first message is sent from the CRE to the SRE via the http communication. The SRE receives the first message and sends an acknowledgement of the receipt of the first message to the CRE. Upon receiving of the acknowledgement within a certain time threshold, the CRE removes the first message from the first message queue in the CRE.

Implementations of this aspect of the invention may include one or more of the following features. Upon not receiving of the acknowledgement by the CRE within a certain time threshold, the CRE sends the first message again to the SRE. Upon not receiving of the acknowledgement by the CRE within a certain time threshold, the CRE raises an error condition. The method may further include the following steps. Maintaining a second message queue in the SRE, attaching a second unique identification to a second message from the second message queue and sending the second message from the SRE to the CRE. Upon receiving of the second message by the CRE, the CRE sends an acknowledgement of the receipt of the second message to the SRE. Upon receiving of the acknowledgement by the SRE within a certain time threshold, removing the second message from the second message queue in the SRE.

In general, in another aspect, the invention features a method for providing "once-and-only message delivery" for network-based communications between a client machine and a server. The client machine comprises a Client Runtime Environment (CRE) and the server comprises a Server Runtime Environment (SRE). The method includes the following steps. Maintaining a first message queue in the CRE, attaching a first unique identification to a first message from the first message queue and sending the first message from the CRE to the SRE via the http communication. Next, receiving the first message by the SRE and checking whether the first message with the first unique identification has been previously received by the SRE or not. Upon determining that the first message with the first unique identification has been previously received by the SRE, discarding the first message.

Implementations of this aspect of the invention may include one or more of the following features. Upon determining that the first message with the first unique identification has not been previously received by the SRE, maintaining the first message in the SRE. A second message queue is maintained n the SRE and a second unique identification is attached to a second message from the second message queue and sending the second message from the SRE to the CRE. The CRE receives the second message and checks whether the second message with the second unique identification has been previously received by the CRE or not. Upon determining that the second message with the second unique identification has been previously received, the CRE discards the second message. Upon determining that the second message with the second unique identification has not been previously received, the CRE maintains the second message.

In general, in another aspect, the invention features a method for providing "guaranteed order message delivery" for network based communications between a client machine and a server. The client machine comprises a Client Runtime Environment (CRE) and the server comprises a Server Runtime Environment (SRE). The method includes the following steps. Maintaining a first message queue in the CRE, wherein the first message queue comprises at least a first message and a second message and the first message is ordered after the second message in the first message queue. Next, attaching a first unique identification to the first message wherein the first unique identification comprises a first indication that the first message is ordered after the second message. Then, sending the first message from the CRE to the SRE via the network communication. Next, receiving the first message by the SRE and checking whether the second message has been previously received by the SRE. Upon determining that the second message has not been received yet, sending a request to the CRE for sending the second message.

Implementations of this aspect of the invention may include one or more of the following features. Upon determining that the second message has been already received by the SRE placing the first message and the second message in a SRE message storage so that the first message is ordered after the second message. A second message queue may also be maintained in the SRE and the second message queue may include at least a third message and a fourth message and the third message is ordered after the fourth message in the second message queue. The SRE attaches a second unique identification to the third message wherein the second unique identification comprises a second indication that the third message is ordered after the fourth message, and sends the third message to the CRE via the network communication. The CRE receives the third message and checks whether the fourth message has been previously received by the CRE. Upon determining that the fourth message has not been received yet, sending a request to the SRE for sending the fourth message. Upon determining that the fourth message has been already received by the CRE placing the third message and the fourth message in a CRE message storage so that the third message is ordered after the fourth message.

In general in another aspect the invention features a system for performing 'server-push" of information from a server to a client machine for a Java Servlet based web application via a request/response communication cycle. The system includes an application server having a Java Servlet Engine for running the Java Servlet based web application, a push Servlet and a push Application Program Interface (API). The push Servlet maintains open a network connection from the server to the client machine and the Java Servlet based web application calls the push API to push information from the server to the client machine.

Implementations of this aspect of the invention may include one or more of the following features. The push API contains methods including sending "push messages", checking "push connection" status, ending "push connection", starting "push connection" or exiting 'wait' mode of the push Servlet. The server receives a request from the client machine for receiving one or more "push messages" and the Java Servlet Engine creates a ServletRequest object and a ServletResponse object, enters the request into the ServletRequest and calls the push Servlet to process the request within a first thread. The push Servlet gains control of the first thread execution, holds onto the Servlet Request and the Servlet Response objects and waits for the one or more "push messages" without returning control back to the Java Servlet Engine. The Java Servlet based web application calls the push API to send the one or more "push messages" in separate threads. The push API upon receiving the send the one or more "push messages", wakes up the push Servlet from a "wait" mode and the push Servlet writes the one or more "push messages" to the ServletResponse object and flushes them to the client machine and then waits for further "push messages". The Java Servlet based web application calls the push API to "end push messages" upon occurrence of a certain external event and wherein the API upon receiving the "end push messages" notifies the push Servlet and the push Servlet writes "end push messages" to the ServletResponse object, flushes it out to the client machine and returns control of the first thread execution back to the Java Servlet Engine. Finally, the Java Servlet Engine finishes the request/response cycle. The push Servlet maintains open the network connection from the server to the client machine by sending a response having a header instructing the client machine not to close the network connection until a certain condition is met. The header may have a "Content-type" header field indicating that the response is a "multipart" mime-type response and the certain condition comprises an end of the "multipart" mime-type response. The header may have a "Transfer-encoding" header field indicating that the response is "chunked" and the certain condition comprises an end of the "chunked" response. The header may have a "Content-length" header field indicating that the response is a number that is bigger than a sum of all content lengths of the push messages, and the certain condition comprises a total number of bytes to be delivered equals or exceeds the number.

Among the advantages of this invention may be one or more of the following. By using the distributed computing system of this invention, software developers can write web-based applications to perform complex tasks that are not easy using the stateless web infrastructure. Because the application state is maintained on the client side, applications can be very responsive, perform complex business logic without having to make a round trip to the server. Because the application state is also available on the server side, server side business logic can dynamically query the client state without having to make a round trip to the client side, thereby significantly improving application performance. Because the client DOM and server DOM are synchronized automatically, developers do not need to write code to perform such a task, thereby lowering development cost and maintenance challenges. Such an automatic synchronization also enables optimal usage of bandwidth because it is possible to send only incremental changes between the CRE and SRE, thereby avoiding bandwidth clogging full-page refreshes and significantly lowering bandwidth consumptions.

Furthermore, because there is application state information available on both the CRE and SRE, an application can still run even if the network is not available. The changes are kept in the DOM and are automatically synchronized once the network is reconnected. This enables an entire class of applications that require offline operations to run on the present web architecture.

Furthermore, because network communication is completely managed by the CRE and the SRE, significant development and maintenance savings are achieved because developers do not need to alter the network communication. The CRE and SRE can optimize the communication layers so it is reliable and bandwidth efficient. In one example, the present invention saves 90% bandwidth as compared with HTML based computing.

Importantly, the above system makes writing applications for various devices much easier. Beyond running inside a web browser, CRE can be adapted to run on many difference devices such as Pocket PC and Handheld devices. In one example, a client program running on a mobile phone is written using XML for voice-based and form-based user interaction. A user can interact with the mobile phone using voice or an onscreen keyboard. This client program is extremely lightweight, clearly readable, and manages a voice-based user interaction in a fully functional way.

Cross platform capability is yet another benefit. Applications written using XML can run over any device as long as the device supports such CRE. For example, a rich graphical user interface (GUI) application can run on Palm devices as well as on Windows CE devices without the need for recoding. Note that such cross platform capability is quite different from the "Write Once, Run Anywhere" capability of Java programs. Java programs are written using Object Oriented Java APIs that require developers to do a lot of low level programming such as managing network communications and low level graphics drawings. Such low level programming is device dependent and not usually portable. Writing cross platform client-side Java applications is still challenging. The method of this invention provides a much higher level of abstraction that is usually portable and applications are usually written using XML directly. Low level operations are completely handled by the support infrastructure rather than being left to application developers.

Furthermore, the system of this invention provides users the capability to access and run a variety of applications on a various computing devices without downloading and installing these applications beforehand, thereby overcoming the computing power and storage limitations of these devices. Companies can store all XML applications on central servers and users can download the XML documents for these applications on the fly in their computing devices. Such XML documents can be transmitted quickly over the network, even over slow network connections, so that there is little wait time from the user's perspective. No further installation is needed. The number of available applications is not limited by the computing power available at the device, but rather by what is available on the server.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 1A is an example of first and second markup documents, the corresponding object oriented representations of the first and second markup documents, and the corresponding displays in the client machine in the prior art web-based computing system;

FIG. 6B is a screen shot of an updated XML screen as shown in the client machine;

FIG. 9A-FIG. 10 are flow diagrams of the "server-push" method that utilizes a push Servlet.

DETAILED DESCRIPTION OF THE INVENTION

Figure 2:
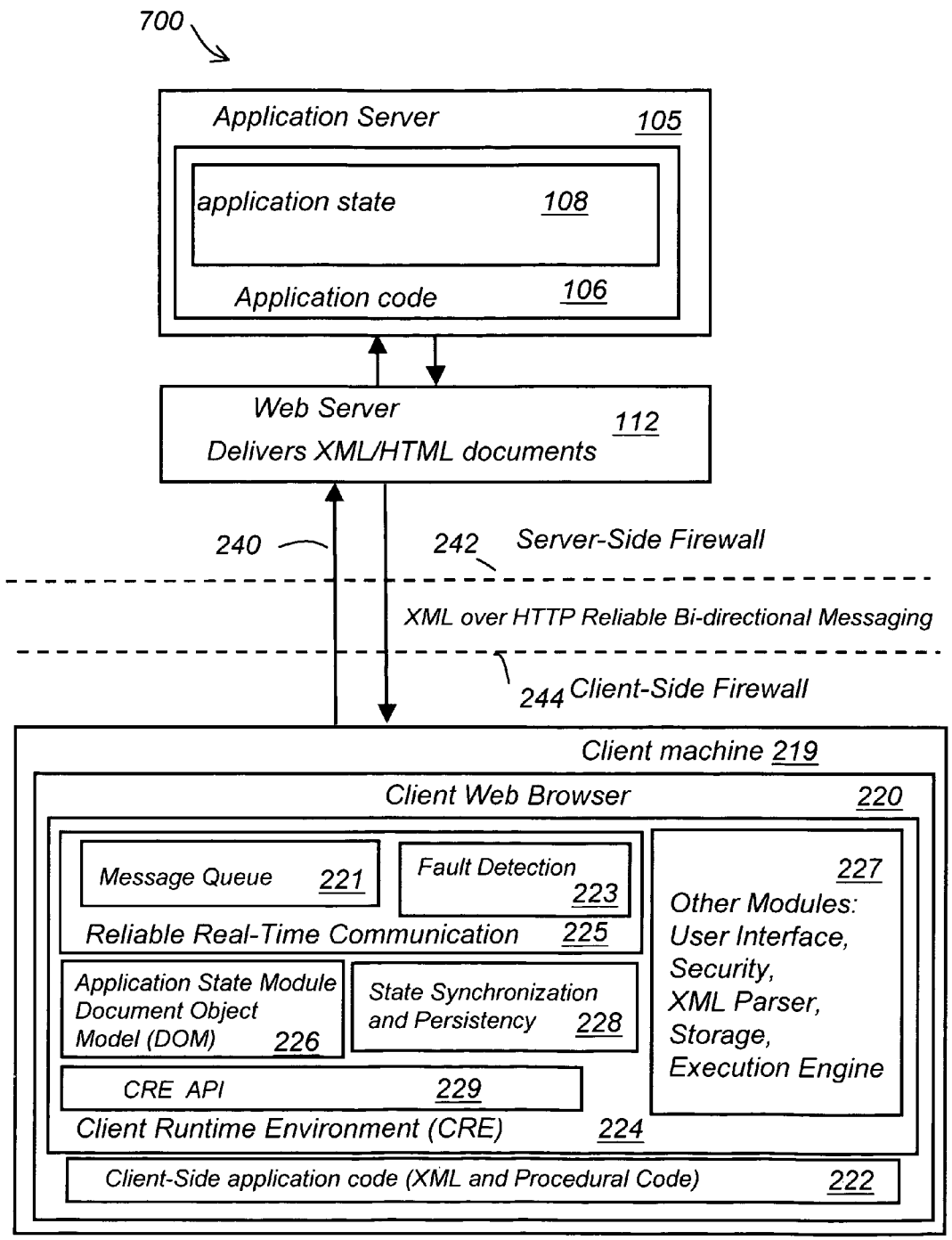
FIG. 2 is a block diagram of a first embodiment of a stateful web-based computing system of this invention.

Referring to FIG. 2, a distributed computing system 700 includes a client machine 219, a web server 112, and an application server 105. The application server 105 runs behind the web server 112, and runs server side applications 106. The web server 112 delivers HTML or XML documents generated by the server side applications 106 to a client web browser 220 residing inside the client machine 219. A real time, bidirectional, reliable messaging system 240 transmits messages between the client web browser 220 and the web server 112 over an HTTP web connection. The client machine 219 includes a client runtime environment (CRE) 224 that runs inside the client web browser 220 and client side application code 222. In other embodiments the CRE runs outside the client web browser 220. The client side application code 222 includes Extensible Markup Language (XML) documents and script. The CRE 224 is protected by a client side firewall 244 and the web server 214 is protected by a server side firewall 242. The CRE 224 includes a Document Object Model (DOM) 226, a communications module 225, a state synchronization and persistency module 228 and other functional modules 227 such as an XML parser, a user interface, storage, security, and an execution engine. The XML Parser is responsible for parsing XML documents that come from the application server 105. The parsing results may be stored in the client side DOM 226 as part of the application's client side state. The user interface module is responsible for displaying the user interface and interacting with the user according to the application's XML description. The execution engine module is capable of running client side application code 222. The DOM 226 maintains the application's client side state and is updated by the CRE automatically. The synchronization and persistency module 228 is responsible for synchronizing the DOM 226 with the application server 105O, and saving and/or retrieving the DOM 226 from persistent storage.

Figure 1:
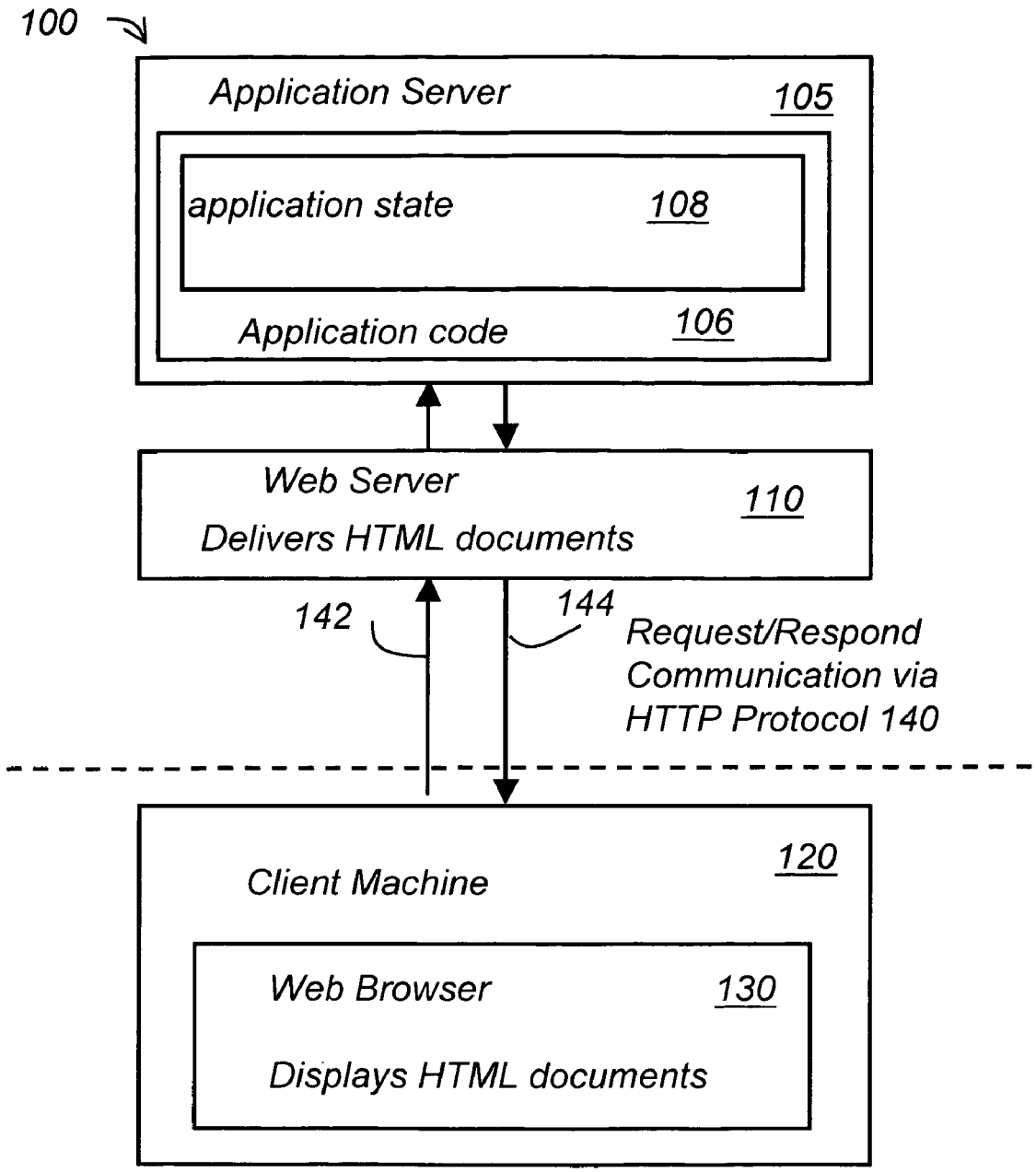
FIG. 1 is a block diagram of a stateless prior art web-based computing system.
Figure 2A:
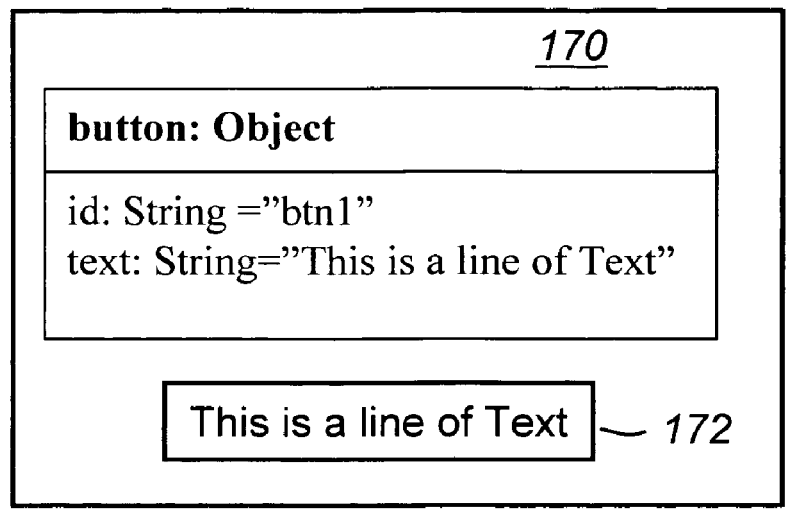
FIG. 2A depicts the first and second displays of the example of FIG. 1A in the stateful web-based computing system of FIG. 2.
Figure 2A:
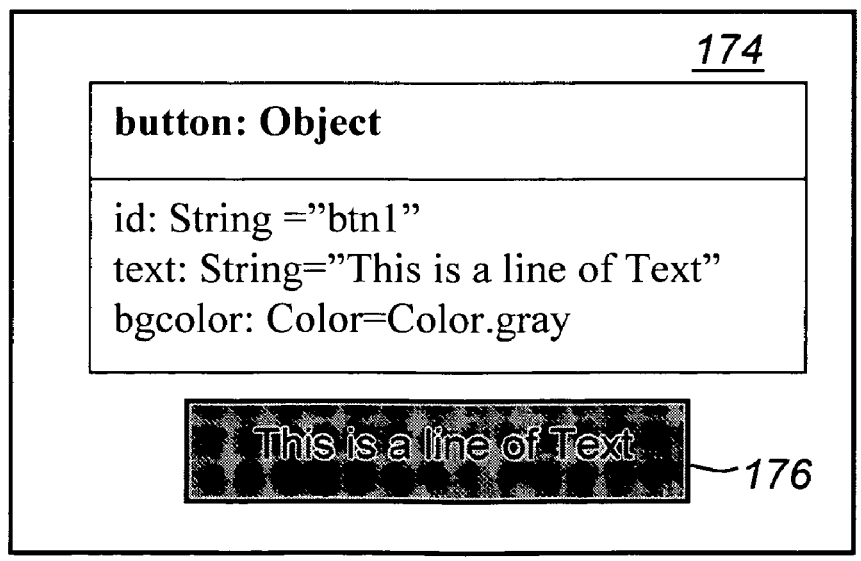

Referring back to FIG. 1A and FIG. 2A, the computing system 700 of FIG. 2 maintains the state of the application in the client side DOM 226 according to following process. First the CRE 224 retrieves a first markup document 142 of page1.xml from the application server 105 and process it into a first object oriented representation 144. The first markup document 142 contains code that will display text saying "This is a line of Text" 150 in the client machine 120. Next the CRE 224 retrieves a second markup document 146 of page2.xml from the application server 105 and processes it into a second oriented representation 148. The second markup document 146 contains code that will display a gray button 152 in the client machine 120. Next the CRE 224 merges the information contained in the first and second object oriented representations 144 and 146 and creates a new object oriented representation 174. The new object oriented representation 174 displays the text "This is a line of Text" in a gray button background 176, thereby maintaining the state of the first and second markup documents 142, 146. The object oriented representations 142, 144, and 174 are stored in the client side DOM 226.

Figure 4:
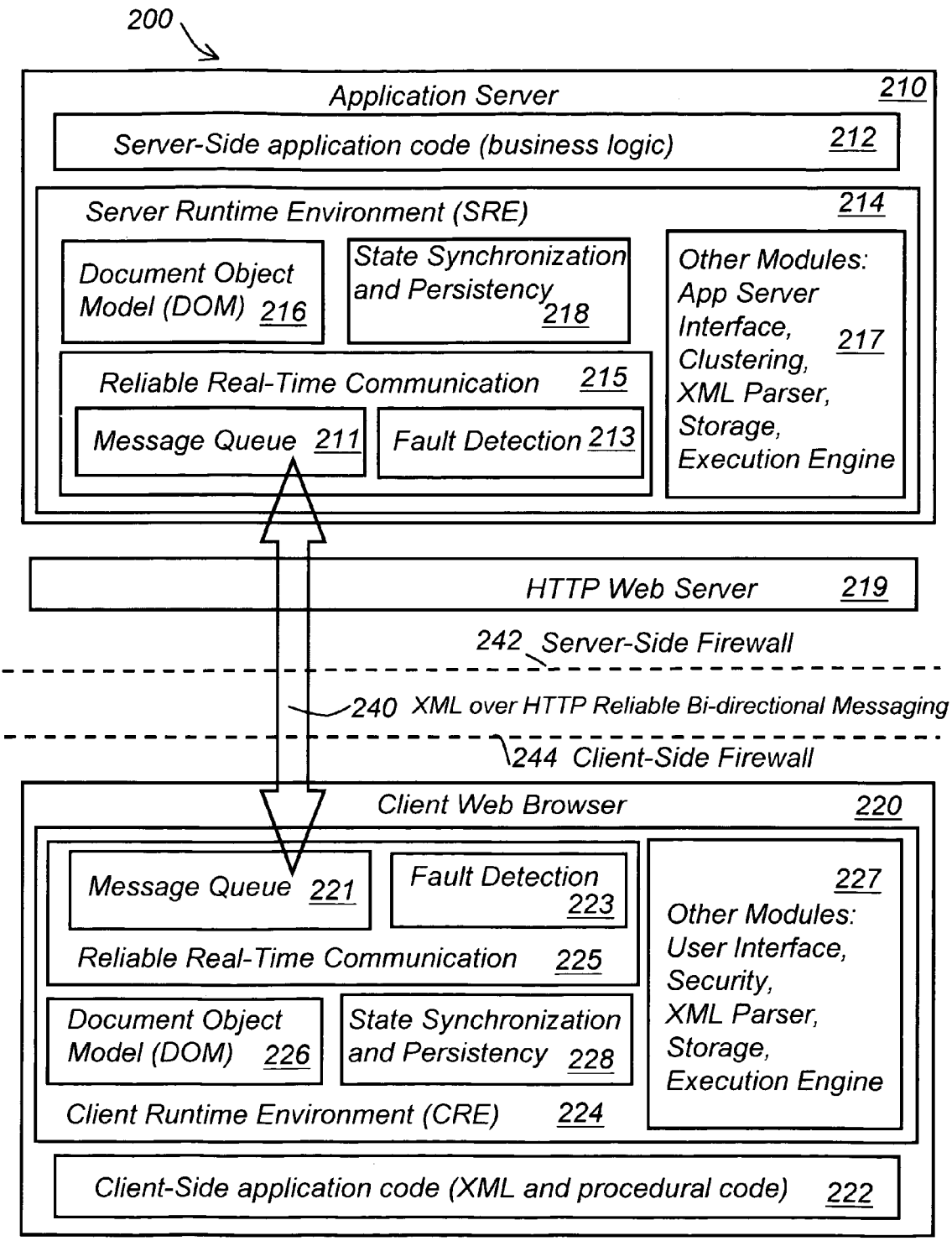
FIG. 4 is a block diagram of yet another embodiment of a stateful computing system of this invention.

Referring to FIG. 4, the distributed computing system 200 includes a client runtime environment (CRE) 224 that runs inside a client web browser 220, an application server runtime environment (SRE) 214 that runs behind an HTTP web server 219, and a real time, bidirectional, reliable messaging system 240 sending and receiving messages between the CRE 224 and SRE 214 over an HTTP web connection. The CRE 224 is protected by a client side firewall 244 and the SRE 214 is protected by a server side firewall 242. Messages pass through the normal firewall ports 80 (not shown) in the corresponding client side firewall and server side firewall. An application contains a client side code 222 and a server side code 212. In one example the client side application code 222 and the server side application code 212 contain XML documents and scripts. The CRE 224 maintains the state of the client side application in an XML client side Document Object Model (DOM) 226. DOM 226 provides an object orientated way of representing a document and defines what attributes are associated with each object, and how the objects and attributes can be manipulated. The SRE 214 also maintains the state of the server side application in a server side DOM 216. The client side DOM 226 and the server side DOM 216 synchronize each other automatically via the real time bidirectional messaging 240 without requiring any additional changes in the client side firewall 244 or the server side firewall 242.

The CRE 224 includes, in addition to the DOM 226, a communications module 225, a state synchronization and persistency module 228 and other functional modules 227 such as an Extensible Markup Language (XML) parser, a user interface, storage, security, and an execution engine. The XML Parser is responsible for parsing XML documents that come from the application server 210. The parsing results may be stored in the client side DOM 226 as part of the application's client side state. The user interface module is responsible for displaying the user interface and interacting with the user according to the application's XML description. The execution engine module is capable of running client side application code 222 that comes from XML documents on the application server 210. As mentioned, DOM 226 represents the application's client side state and is updated by the CRE automatically. The synchronization and persistency module 228 is responsible for synchronizing the DOM 226 with the application server 210, and saving and/or retrieving the DOM 226 from persistent storage.

The SRE 214 runs behind the HTTP web server 219 and inside the application server 210. The SRE 214 is architecturally similar to the CRE 224. It includes in addition to the server side DOM 216, a communications module 215, a synchronization and persistency module 218 and other functional modules 217. Most of these modules play the same role as their equivalent on the client side. The server side DOM 216 is constructed by parsing XML documents that are sent to the SRE 214. As a result, the server side DOM 216 mirrors the client side of the application's state and makes it available to the server side application code 212. Furthermore, when the server side application code 212 modifies the server side DOM 216 the SRE 214 sends a message to the client side of the application so that the client side DOM 226 also gets updated. When the client side application code 222 or the user changes the client side DOM 226, the CRE 224 sends a message to the SRE 214 so that the server side DOM 216 is synchronized. There are some additional modules such as an application server interface module and a clustering module. The application server interface module enables the SRE 214 to run inside the application server 210 and enables applications inside the application server 210 to access the SRE's functionalities. The clustering module provides support for clustering the SRE.

Figure 3:
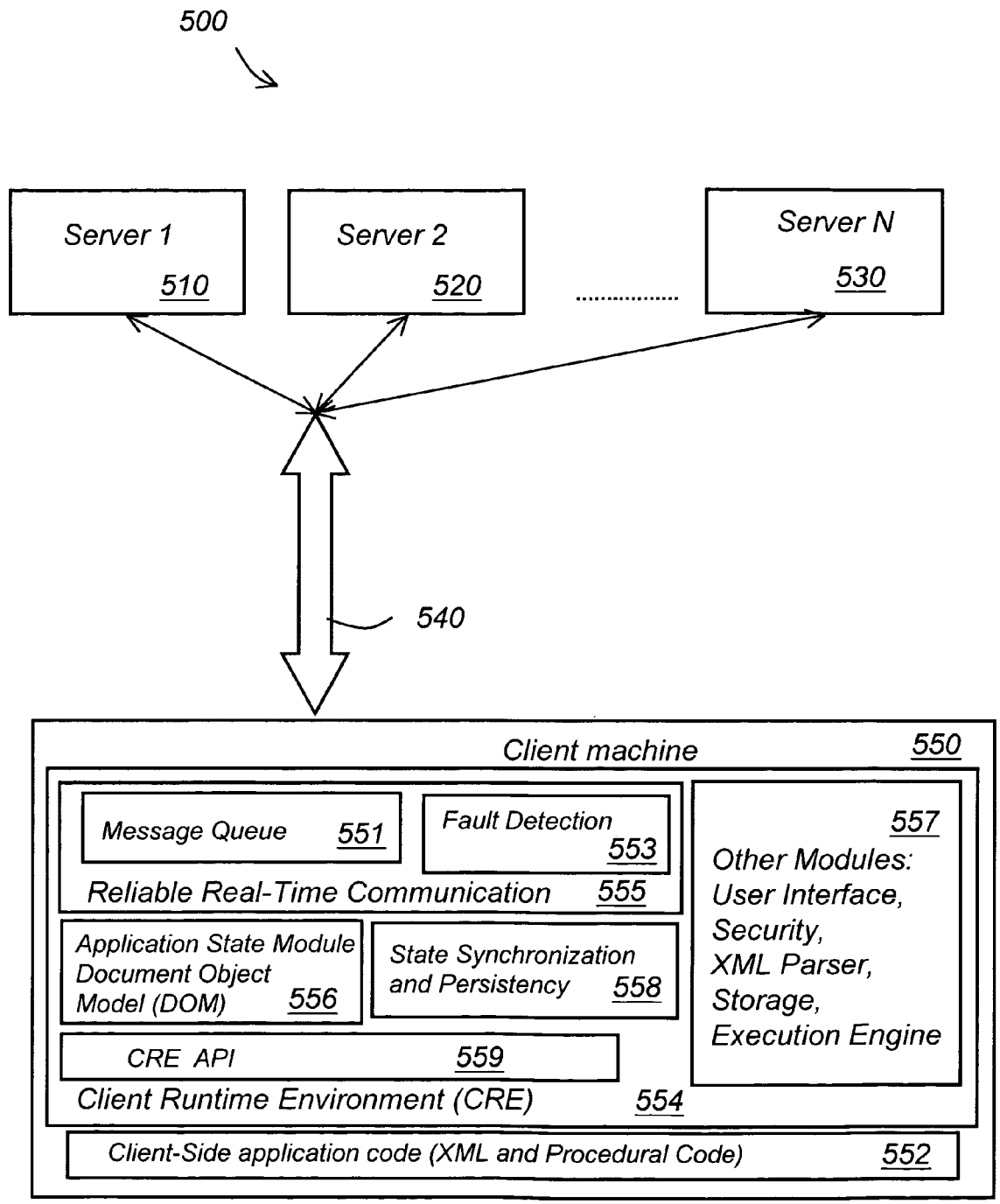
FIG. 3 is a block diagram of another embodiment of a stateful computing system of this invention.

Stateful computing according to this invention is also applied to a distributed computing system that includes a client machine networked with a plurality of servers. Referring to FIG. 3, the distributed computing system 500 includes a client machine 550 and servers 1 to N, where N is an integer number larger than zero, 510, 520, . . . 530. Client machine 550 is networked with servers I to N via a network 540. Network 540 may be either a wireless or a wired network and the communication may be HTTP or TCP. The client machine 550 includes a CRE 554 and a client side application code 552. The client side application code includes XML and script pages. The CRE 554 includes a DOM 556 for maintaining the state of the client side of an application, a communication module 555, a state synchronization and persistency module 558 and other functional modules 557 such as an Extensible Markup Language (XML) parser, a user interface, storage, security, and an execution engine. The XML Parser is responsible for parsing XML documents that come from the servers 1 to N. The parsing results may be stored in the client side DOM 556 as part of the application's client side state. The user interface module is responsible for displaying the user interface and interacting with the user according to the application's XML description. The execution engine module is capable of running the client side application code 552. The synchronization and persistency module 558 is responsible for synchronizing the DOM 556 with the servers 1 to N, and saving and/or retrieving the DOM 556 from persistent storage. In one example, servers 1 to N run web services and client machine 550 is a web service consumer.

Figure 6A:
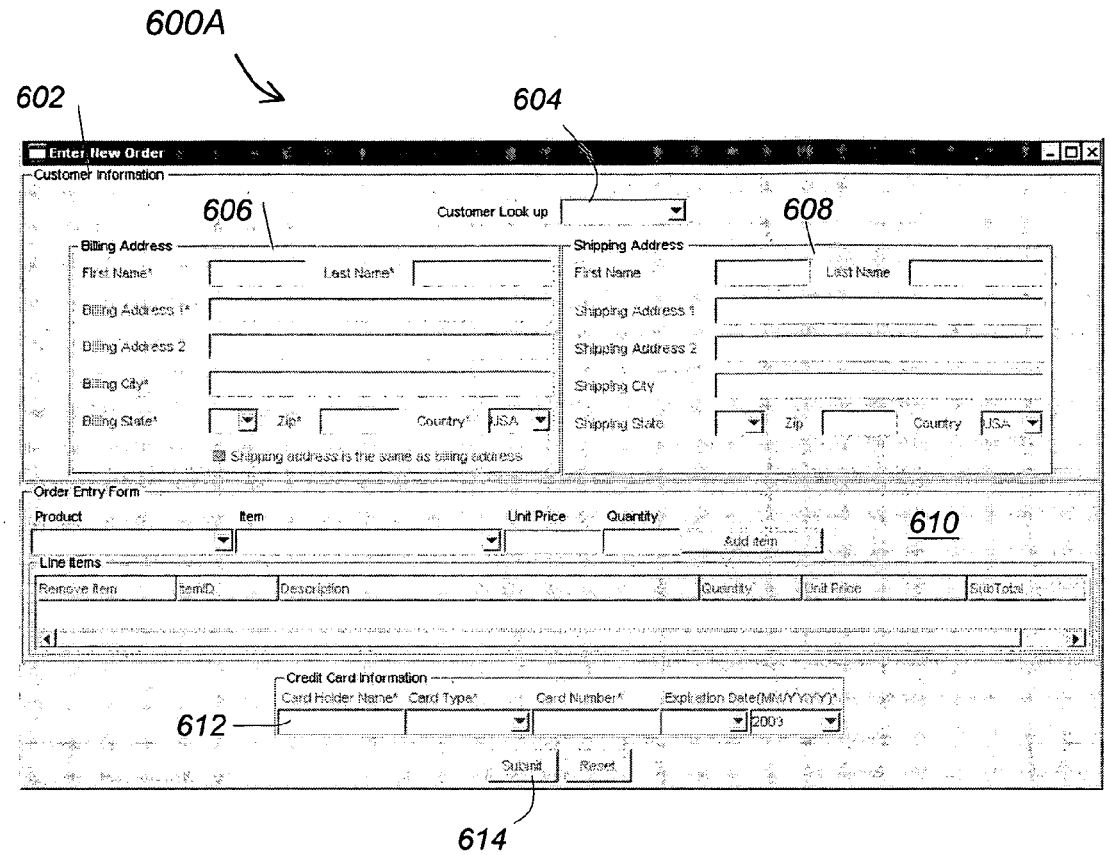
FIG. 6A is a screen shot of an initial XML screen as shown in the client machine.

Application code designed to run on the distributed computing platforms of FIG. 2, FIG. 3 and FIG. 4 is similar to today's HTML web application code, i.e., the database tier and server side business logic tier are handled by the application server. In one example, the presentation tier is developed using Java Server Pages and Servlets. The difference in the present invention is that the user interface of the application is described using XML instead of HTML. In one example, the application code for an initial XML markup document that displays the initial screen form shown in FIG. 6A is as follows. Initial XML markup document:

```xml
<xml>
  <remove id="mypopup"/>
  <popupmenu id="mypopup" location="10,10" bgcolor="white" bordercolor="red" borderstyle="solid" borderwidth="1" visible="false">
        <menuitem text="Status: Incomplete" font="Tahoma,bold,12" fgcolor="red" />
        <separator />
            <panel>
            <panel>
            <panel>
            <label font="Tahoma,bold,12" fgcolor="red" text="Credit Card"/>
            <label id="popup_cc_name" text="Empty card holder" visible="false"/>
            <label id="popup_cc_no" text="Empty or invalid card number" visible="false"/>
            <label id="popup_cc_type" text="Empty card type" visible="false"/>
            <label id="popup_cc_mm" text="Empty card month" visible="false"/>
            <label id="popup_cc_ok" text="OK" font="Tahoma,bold,12" fgcolor="green" visible="false"
            <layoutmanager layout="boxlayout" orientation="vertical" align="start"/>
            </panel>
            <label img="./images/verticalline.gif"/>
            <panel>
            <label font="Tahoma,bold,12" fgcolor="red" text="Billing Address"/>
            <label id="popup_b_fname" text="Empty first name" visible="false"/>
            <label id="popup_b_lname" text="Empty last name" visible="false"/>
            <label id="popup_b_addr1" text="Empty address line#1" visible="false"/>
            <label id="popup_b_city" text="Empty city field" visible="false"/>
            <label id="popup_b_state" text="Empty state field" visible="false"/>
            <label id="popup_b_zip" text="Empty zip field" visible="false"/>
            <label id="popup_b_country" text="Empty country field" visible="false"/>
            <label id="popup_b_ok" text="OK" font="Taboma,bold,12" fgcolor="green" visible="false"/>
            <layoutmanager layout="boxlayout" orientation="vertical" align="start"/>
            </panel>
            <label img="./images/verticalline.gif"/>
            <panel>
            <label font="Tahoma,bold,12" fgcolor="red" text="Shipping Address"/>
            <label id="popup_s_fname" text="Empty first name" visible="false"/>
            <label id="popup_s_lname" text="Empty last name" visible="false"/>
            <label id="popup_s_addr1" text="Empty address line#1" visible="false"/>
            <label id="popup_s_city" text="Empty city field" visible="false"/>
            <label id="popup_s_state" text="Empty state field" visible="false"/>
            <label id="popup_s_zip" text="Empty zip field" visible="false"/>
            <label id="popup_s_country" text="Empty country field" visible="false"/>
            <label id="popup_s_ok" text="OK" font="Tahoma,bold,12" fgcolor="green" visible="false"/>
            <layoutmanager layout="boxlayout" orientation="vertical" align="start"/>
            </panel>
            <layoutmanager layout="boxlayout" orientation="horizontal" align="stretch"/>
            </panel>
        <layoutmanager layout="boxlayout" orientation="vertical"/>
            </panel>
    </popupmenu>
<mco id="formhandler" src="com.nexaweb.samples.orderdemo.FormHandler"/>
<remove id="newOrderForm"/>
<remove id="newodercustomerbox"/>
<window id="newOrderForm" title="Enter New Order" size="850,520" location="20,20" focused="true" onclose="processOrder.do?command=closeNewOrder" modal="true">
        <panel bordertitle="Customer Information" borderwidth="2" titlejustification="left" borderstyle="groove" margin="3,3,3,3">
            <panel>
            <panel id="newordercustomerlookup">
                <label text="Customer Look up"/>
                <combobox id="combo_newordercustomerbox" size="100,20" oncommand="processOrder.do?command=populateaddress">
                    <listbox id="newodercustomerbox">
                     <listitem id="newordercustomer-0" text="New Customer"/>
                    <listitem id="newordercustomer-1" text="Mike Adam"/>
                    <listitem id="newordercustomer-2" text="Jyothi Smith"/>
                    <listitem id="newordercustomer-3" text="Nancy Doss"/>
                    <listitem id="newordercustomer-4" text="Steve Job"/>
                    <listitem id="newordercustomer-5" text="Bill Gates"/>
                    <listitem id="newordercustomer-6" text="Kevin Sab"/>
```

-continued

```
            <listitem id="newordercustomer-7" text="Bill Clinton"/>
            <listitem id="newordercustomer-8" text="Catherine Zeta-Jones"/>
          </listbox>
        </combobox>
            <layoutmanager layout="flowlayout" justifyh="left"/>
      </panel>
            <layoutmanager layout="flowlayout" justifyh="left"/>
        </panel>
        <panel id="neworderbillingshippingpanel"
src="neworderbillingshipping.xml"/>
            <layoutmanager layout="boxlayout" orientation="vertical"
align="stretch"/>
        </panel>
        <panel bordertitle="Order Entry Form" borderwidth="2"
titlejustification="left" borderstyle="groove" margin="3,3,3,3">
        <!-- add line item -->
        <panel layoutpos="north">
        <label text="Product"
layoutpos="1,1,1,1,1.0,0,west,horizontal,0,0,0,0,0,0"/>
            <label text="Item" layoutpos="2,1,1,1,1.0,0,west,horizontal,0,0,0,0,0,0"/>
            <label text="Unit Price"
layoutpos="3,1,1,1,1.0,0,west,horizontal,0,0,0,0,0,0"/>
            <label text="Quantity" size="50,20"
layoutpos="4,1,1,1,1.0,0,west,horizontal,0,0,0,0,0,0"/>
            <label text="" layoutpos="5,1,1,1,1.0,0,west,horizontal,0,0,0,0,0,0"/>
            <label text="" layoutpos="6,1,1,1,1.0,0,west,horizontal,0,0,0,0,0,0"/>
      <combobox id="cbbProduct" size="150,20"
layoutpos="1,2,1,1,1.0,0,west,horizontal,0,0,0,0,0,0"
oncommand="processOrder.do?command=getItems">
      <listbox id="lbProduct" >
        <listitem id="liProduct-1" text="Digital Cameras"/>
        <listitem id="liProduct-2" text="Laptops"/>
        <listitem id="liProduct-3" text="Game Console"/>
      </listbox>
      </combobox>
      <combobox id="cbbItem" enabled="false" size="200,20"
layoutpos="2,2,1,1,1.0,0,west,horizontal,0,0,0,0,0,0">
        <listbox id="lbItem">
        <listitem text="dummy"/>
        </listbox>
      </combobox>
      <textbox id="neworder-unitprice" text="" enabled="false" justifyh="right"
layoutpos="3,2,1,1,1.0,0,west,horizontal,0,0,0,0,0,0"/>
            <textbox id="neworder-qty" text="" size="50,20" enabled="false"
justifyh="right" layoutpos="4,2,1,1,1.0,0,west,horizontal,0,0,0,0,0,0"/>
            <button id="btnadditem" text="Add item" size="100,20"
oncommand="processOrder.do?command=addItem" enabled="false"
layoutpos="5,2,1,1,1.0,0,west,horizontal,0,0,0,0,0,0"/>
            <label text="" size="200,20"
layoutpos="6,2,1,1,1.0,0,west,horizontal,0,0,0,0,0,0"/>
            <layoutmanager layout="gridbaglayout"/>
        </panel>
        <panel id="newOrderCartpanel" layoutpos="center" bordertitle="Line Items"
borderwidth="2" titlejustification="left" borderstyle="groove" margin="3,3,3,3"
enabled="false">
            <table id="tblnewOrderItems" size="600,60" altbgcolor="177,182,243"
layoutpos="center" onedit="mco:formhandler.onQtyEdit(2)">
            <col><header size="80,20" text="Remove Item"/></col>
            <col><header size="50,20" text="ItemID"/></col>
            <col><header text="Description" size="300,20" /></col>
            <col><header size="50,20" text="Quantity"/></col>
            <col><header size="100,20" text="Unit Price"/></col>
            <col><header size="100,20" text="SubTotal"/></col>
            </table>
            <layoutmanager layout="borderlayout"/>
        </panel>
        <layoutmanager layout="borderlayout"/>
        </panel>
        <panel id="neworderccpanel" src="neworderccc.xml"/>
        <panel id="newOrderButtonPanel">
          <button id="neworderbtnSubmit" popup="mypopup" text="Submit"
onmouseover="mco:formhandler.handleMouseOver( )"
onmouseout="mco:formhandler.handleMouseOut( )" enabled="false"/>
            <button id="neworderbtnReset" text="Reset" enabled="false"/>
        </panel>
<layoutmanager layout="boxlayout" orientation="vertical" align="stretch"/>
</window>
</xml>
```

Figure 6B:
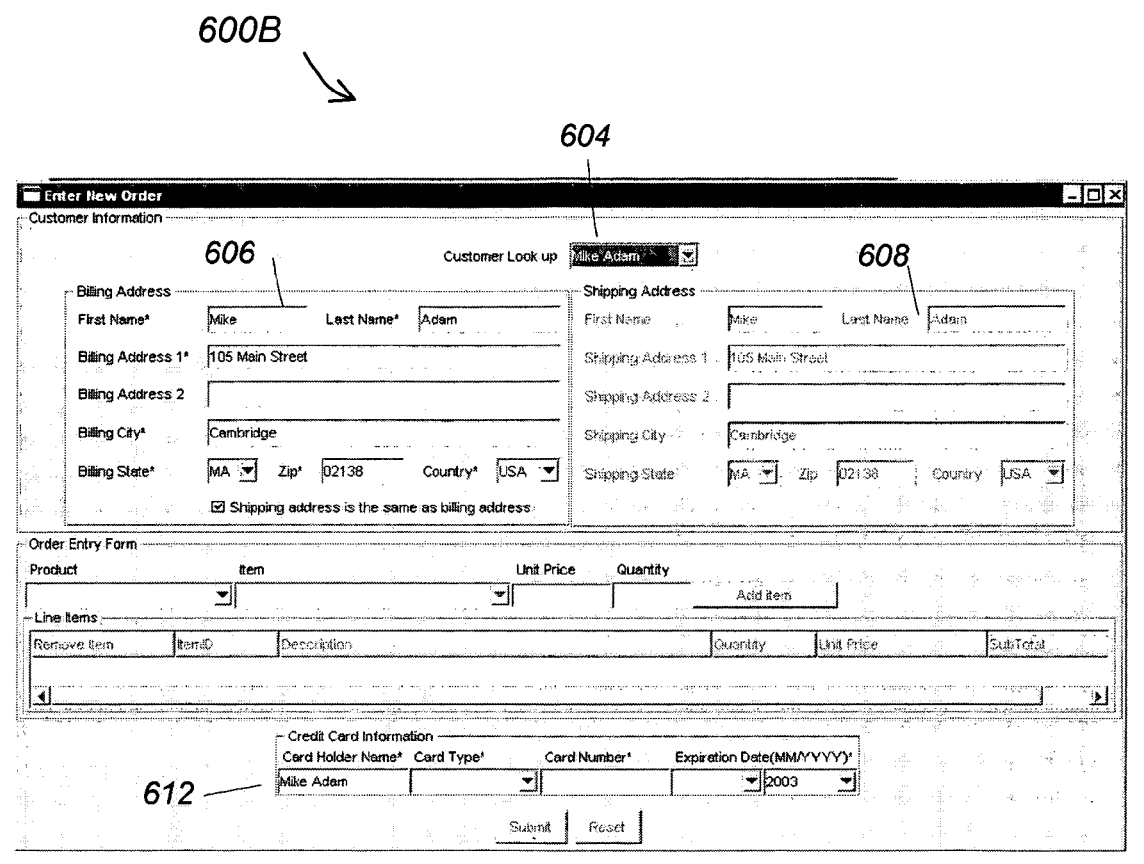

All of the application code is initially stored on the application server 210. Upon receiving the initial XML markup document from the application server 210, the client browser 220 displays the initial screen form 600A, shown in FIG. 6A. In this example the initial screen form 600A is a new order entry form that includes customer information 602 and a customer look up tab 604. The customer information 602 includes billing address information 606, shipping address information 608, order information 610, and payment card information 612. The billing address information 606 includes customer's first and last name and billing address. The shipping information 608 includes first and last name of the person to whom the product will be shipped and the shipping address. The order information 610 includes, the item identification, item description, quantity, unit price, and total price. The credit card information 612 includes credit card holder's name, card type, card number, and expiration date. The user interacts with the initial form 600A by entering the information in the appropriate fields. The user may also look up the name of a customer whose information is already stored in the application server 210. For example, the user may click on the look up tab 604, select the customer name "Mike Adam" and click the submit button 614 at the bottom of the form 600A. The client browser 220 will send the user input to the application server 210 and the application server 210 will retrieve the information and merge the requested information with the initial screen 600A thereby generating the new screen 600B, shown in FIG. 6B. The code for requesting the second XML markup document is as follows:

```
<xml>
<panel id="neworderbillingpanel" enabled="true"/>
<panel id="newordershippingpanel" enabled="true"/>
<panel id="neworderccpanel" enabled="true"/>
<panel id="newOrderCartPanel" enable="true"/>
<textbox id="b_fname" text="Mike" bgcolor="white"/>
<textbox id="b_lname" text="Adam" bgcolor="white"/>
<textbox id="b_addr1" text="105 Main Street" bgcolor="white"/>
<textbox id="b_addr2" text="" bgcolor="white"/>
<textbox id="b_city" text="Cambridge" bgcolor="white"/>
<combobox id="combo_b_state" text="MA" bgcolor="white"/>
<textbox id="b_zip" text="02138" bgcolor="white"/>
<combobox id="combo_b_country" text="USA" bgcolor="white"/>
<textbox id="cc_name" text="Mike Adam" bgcolor="white"/>
<textbox id="s_fname" text="Mike"/>
<textbox id="s_lname" text="Adam"/>
<textbox id="s_addr1" text="105 Main Street"/>
<textbox id="s_addr2" text=""/>
<textbox id="s_city" text="Cambridge"/>
<combobox id="combo_s_state" text="MA"/>
<textbox id="s_zip" text="02138"/>
<combobox id="combo_s_country" text="USA"/>
</xml>
```

The screen display 600B generated from the process of merging the second XML markup document with the first XML markup document includes the previously stored customer billing address information 606, the shipping information 608, and the credit card information 612. The user may now enter the order information and submit it to the application server 210 through the client side browser 220.

Figure 5A:
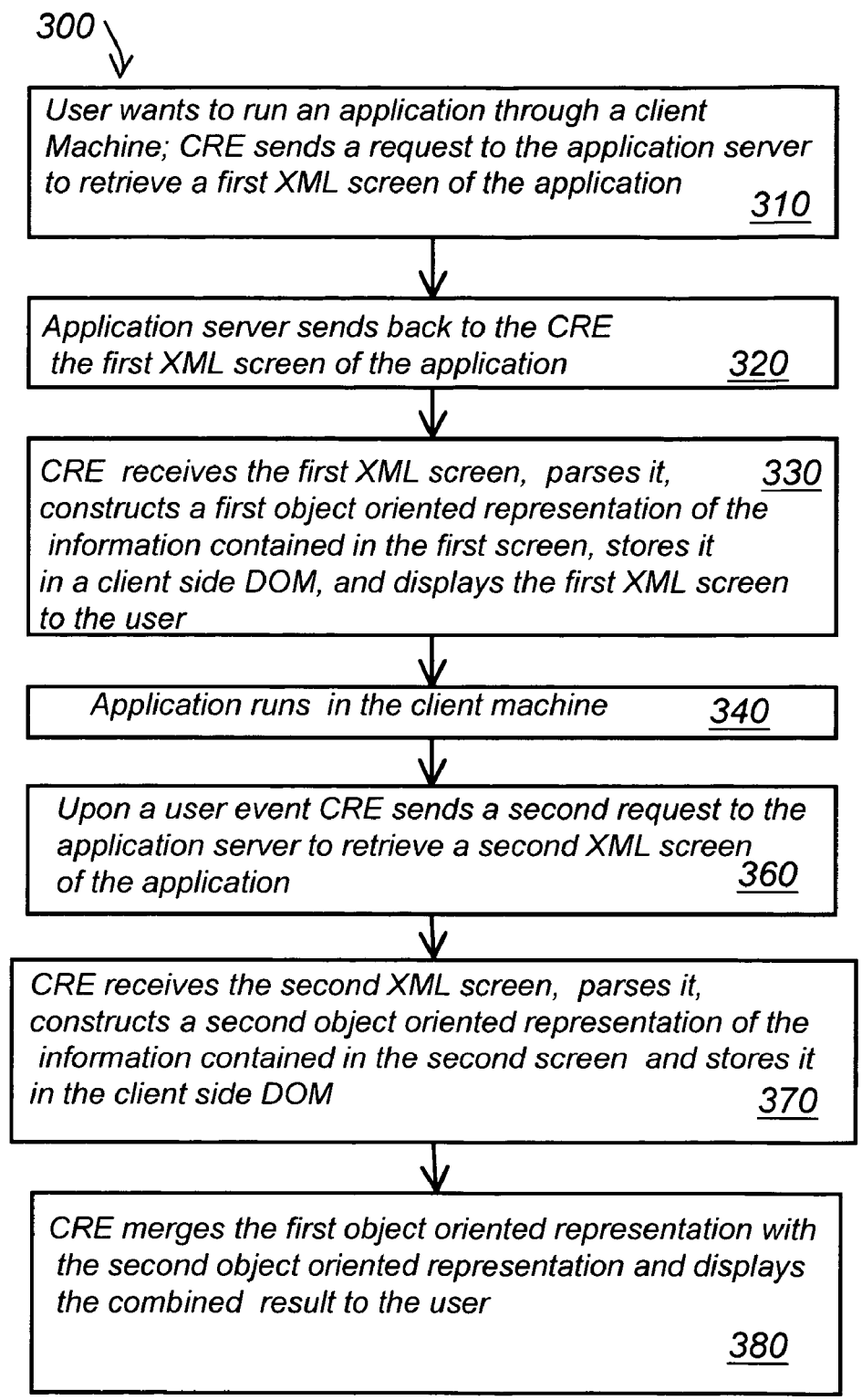
FIG. 5A is a block diagram of the method of running an application in the computing system of FIG. 2.

Referring to FIG. 3 and FIG. 5A, the process 300 of running an application through a client machine 550 and maintaining state of the application includes the following steps. When a user wants to run an application through the client machine 550, the CRE 554 sends a request to an application server 510 to retrieve the XML description of an initial screen of the application (310). The application server 510 responds to this request by sending back to the client machine 550 the initial XML screen (320). The CRE 554 receives this XML document, parses it, and constructs a first object oriented representation of the information contained in the initial screen. The CRE 554 stores the first object oriented representation of the information in a client side DOM 556 for tracking the client side state of the application and displays the application's initial screen to the user (330). Next, the user runs the application in the client machine (340). According to the application's XML description, the CRE 554 may invoke client-side scripts or server-side event handlers to process some of the user events. Upon receiving a user event the CRE 554 sends a second request to the application server 510 to retrieve a second XML screen of the application (360). The CRE 554 receives the second XML screen, parses it, constructs a second object oriented representation of the information contained in the second screen and stores it in the client side DOM 556 (370). Next, the CRE 554 merges the first and second object oriented representations, creates a new object oriented representation of the information contained in the first or second screens and displays the combined result in the client machine 550 (380). This process is repeated so that all further responses received from the scripts or server-side event handlers are further processed by the CRE 554, which will then update the client side DOM 556 and display the result accordingly to the user. If a persistent connection is needed for this application such a connection is established between the client machine 550 and server 510. If there is a client-side business logic defined 552, such business logic is loaded into the CRE 554, cached, and executed accordingly.

Figure 5B:
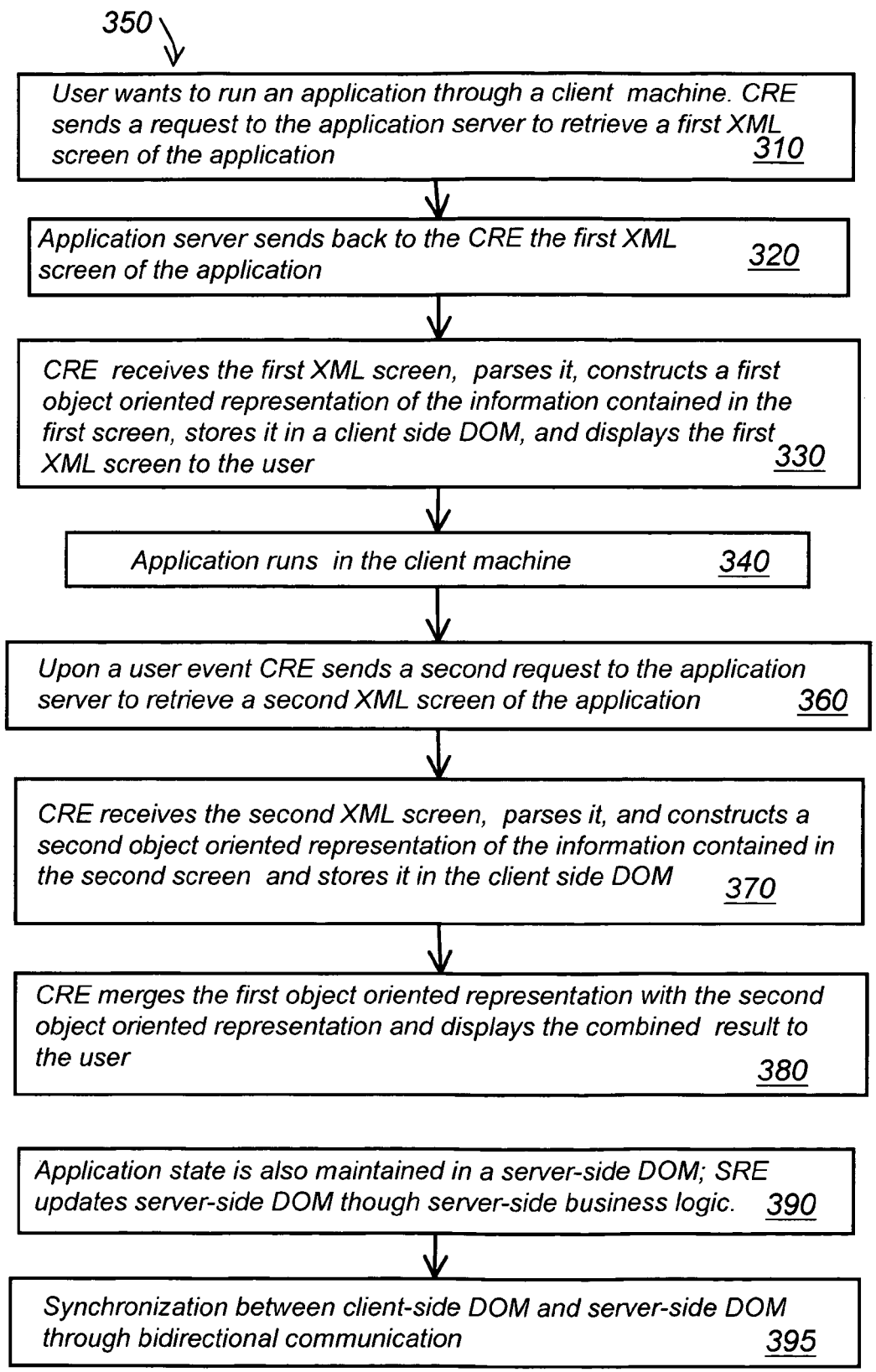
FIG. 5B is a block diagram of the method of running an application in the computing system of FIG. 4.

Referring to FIG. 4 and FIG. 5B, when an application is running in the CRE 224, its state is maintained in the client machine's XML DOM 226. When the user interacts with the application, the CRE 224 updates the client side DOM 226 accordingly to reflect the user's inputs. In the embodiment of FIG. 4, the application's state is also maintained on the application server's DOM 216. When the application's server-side business logic 212 decides to change the state of the application, for example, make a Window invisible, the SRE 214 automatically updates the server side DOM 216 (390). Whenever either DOM 226, 216 has been updated, either the CRE 224 or the SRE 214 will send a message to the other party to synchronize its DOM 226, 216 (395). When the network is disconnected, both the client side of the application and the server side of the application continue to function. Changes of the application state are maintained in the corresponding DOMs 226, 216. When the network connection becomes available again, the CRE 224 and SRE 214 automatically synchronize the DOMs 226, 216, respectively.

The client and server communications, including DOM synchronization and application logic initiated messages, are all delivered via the real-time, bidirectional, reliable communication over HTTP 240. The HTTP communication model itself is a request/response model that does not enable bi-directional communications. According to the prior art HTTP communication model a user places a request from a client machine to a web server and the client machine opens a one way connection to the web server for transmitting the user's request. In the next sequence the web server processes the user's request and responds to the client machine using the previously opened connection in the reverse direction. After the response is delivered the connection is closed. In this prior art communication model the server cannot initiate a connection to the client machine without first receiving a request and therefore it does not allow for a "server push" delivery of information. There are various HTTP tunneling techniques available but they require special client or server software and have potential security problems.

Figure 7:
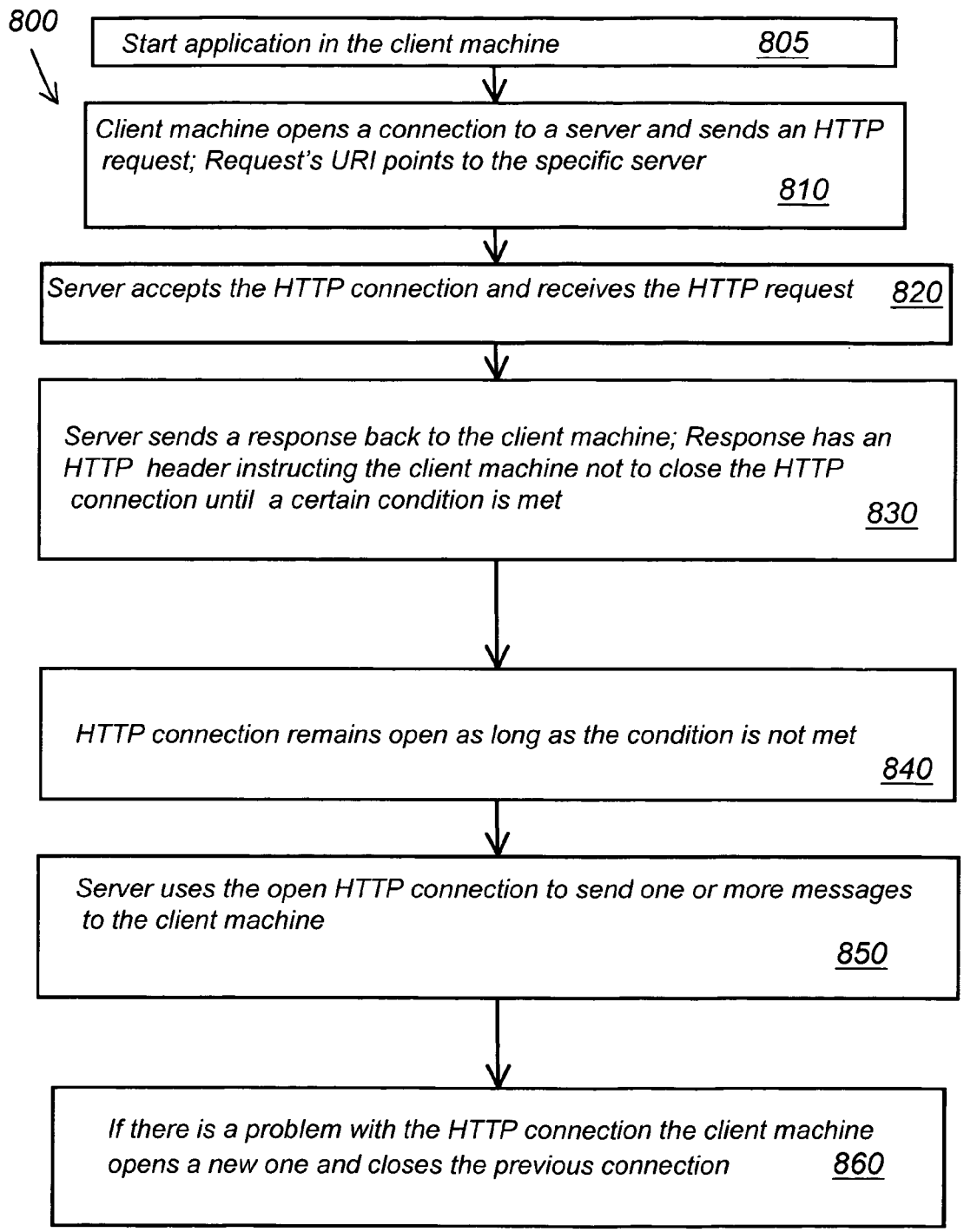
FIG. 7 is a block diagram of the 'server-push" method of this invention.

In the present invention the communication model between the client machine and the application server is built on top of HTTP but it overcomes the usual HTTP limitations of being unreliable and client-pull only. It is also 100% compatible with the existing web infrastructure and requires zero changes to the client side and the server side firewalls. The present invention enables "server push" by making the response to a client request a persistent connection. Referring to FIG. 7, this invention enables persistent connection and "server push" according to the following process 800. When an application is started (805), the client machine opens a connection to a server via a normal HTTP request (810). The request's Uniform Resource Identifier (URI) points to a specific server. A special predetermined request parameter indicates that this request is to establish a persistent connection. The server accepts the HTTP connection and receives the HTTP request (820). Next, the server sends back to the client machine a response that has an HTTP header instructing the client machine not to close the HTTP connection until a certain condition is met (830). The HTTP connection remains open as long as the certain condition is not met (840). The server use this open HTTP connection to do "server-push", i.e., to send one or more messages to the client machine, without the client machine having to send a request (850). Examples of HTTP headers instructing the client machine to keep the HTTP connection open until a certain condition is met include the following. In one example, the HTTP header "content-type" is set to be "multipart" and the certain condition is the end of the "multipart" response.

Code example for a "multipart" response:

HTTP/1.1 200 OK content-type: multipart/mixed;boundary=a

In another example, the HTTP header "content-length" is set to be to a very large number, i.e., 5,000,000 bytes, or larger than the sum of the content length of all messages that the server wants to push to the client machine.

Code example for very large content length response:

HTTP/1.1 200 OK content-length: 5000000 bytes

In another example the HTTP header "transfer-encoding" is set to be "chunked" and the certain condition defines the end of the "chunked" response.

Code example for chunked response:

HTTP/1.1 200 OK content-type: text/html

Transfer-Encoding: chunked

Once established, this persistent connection between the server and the client machine allows the server to send any type of message to the client machine, i.e., to do "server push". Whenever the client machine detects a problem with the persistent connection, it simply opens a new one and closes the previous connection (860).

Figure 8:
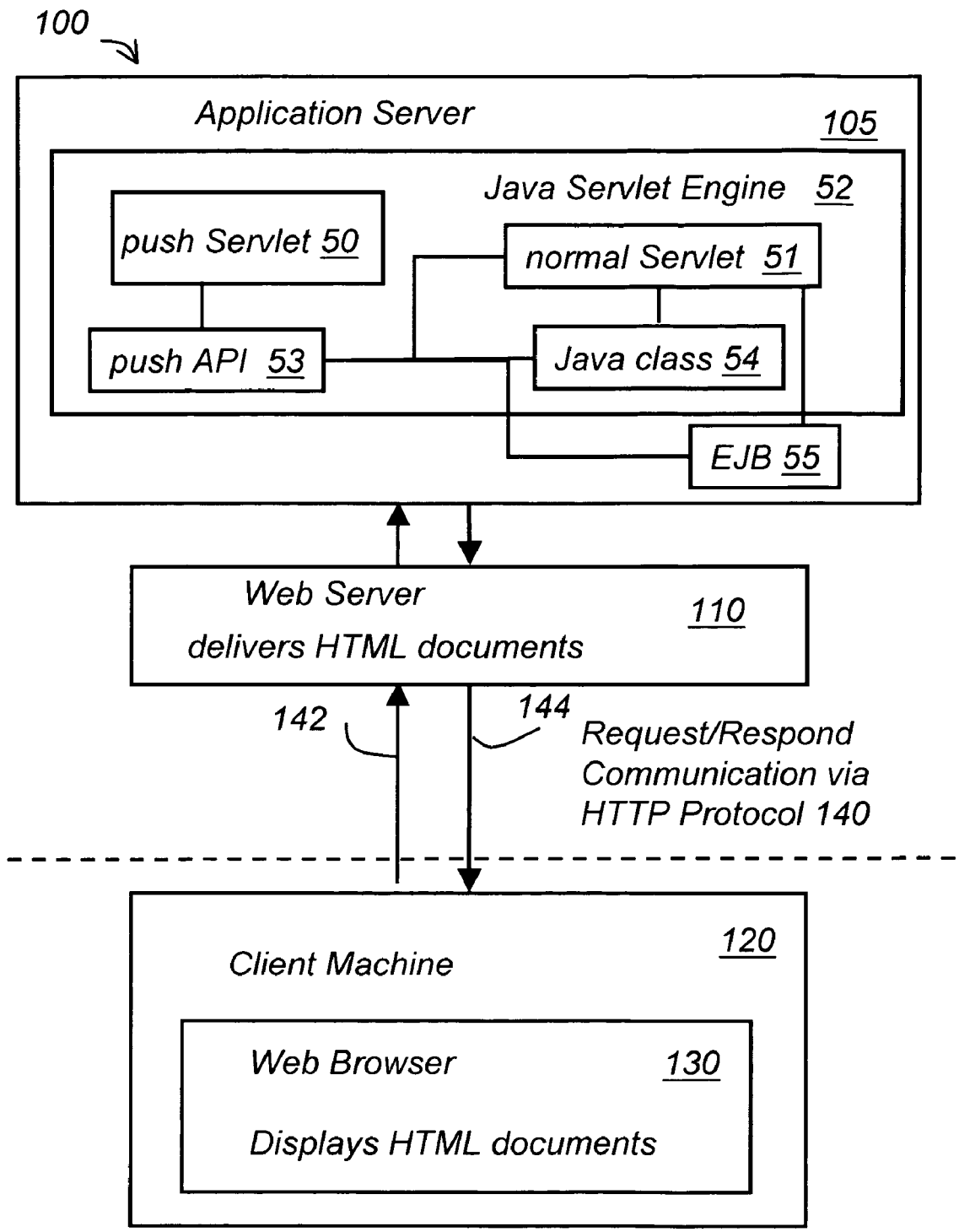
FIG. 8 is a block diagram of a computing system that provides another embodiment of the "server-push" method of this invention.

In another embodiment "server push" is performed by utilizing a Java push Servlet (or Java Server Page (JSP)). Referring to FIG. 8, a Java normal Servlet 51 is a small Java program that runs on a server 105 and answers to request from a client machine 120. Java Servlets utilize the Java standard extension classes contained in the packages "javax.servlet" and "javax.servlet.http". The "javax.servlet" contains the basic Servlet framework and "javax.servlet.http" contains extensions of the Servlet framework for Servlets that answer HTTP requests. Servlets are not tied to a specific client-server communication protocol, but are most commonly used with the HTTP protocol (140). Java Servlets are described in the following web-publication http://www.novocode.com/doc/servlet-essentials, the contents of which are incorporated herein by reference. The HTTP protocol (140) is a request-response oriented protocol. An HTTP request includes a request method, a URI, header fields and a body. An HTTP response contains a result code, header fields and a body. Standard HTTP methods include "GET, PUT, POST, DELETE, HEAD, OPTIONS, TRACE". In Java Servlet, these HTTP methods are dispatched to Java methods by converting them to doGET, doPUT, doPOST, doDELETE, doHEAD, doOPTIONS, doTRACE, respectively. All these methods expect as parameters the objects (ServletRequest, ServletResponse). Examples of these methods include the following:

doGet (ServletRequest, ServletResponse)

doPost (ServletRequest, ServletResponse)

doPut (ServletRequest, ServletResponse)

Figure 9:
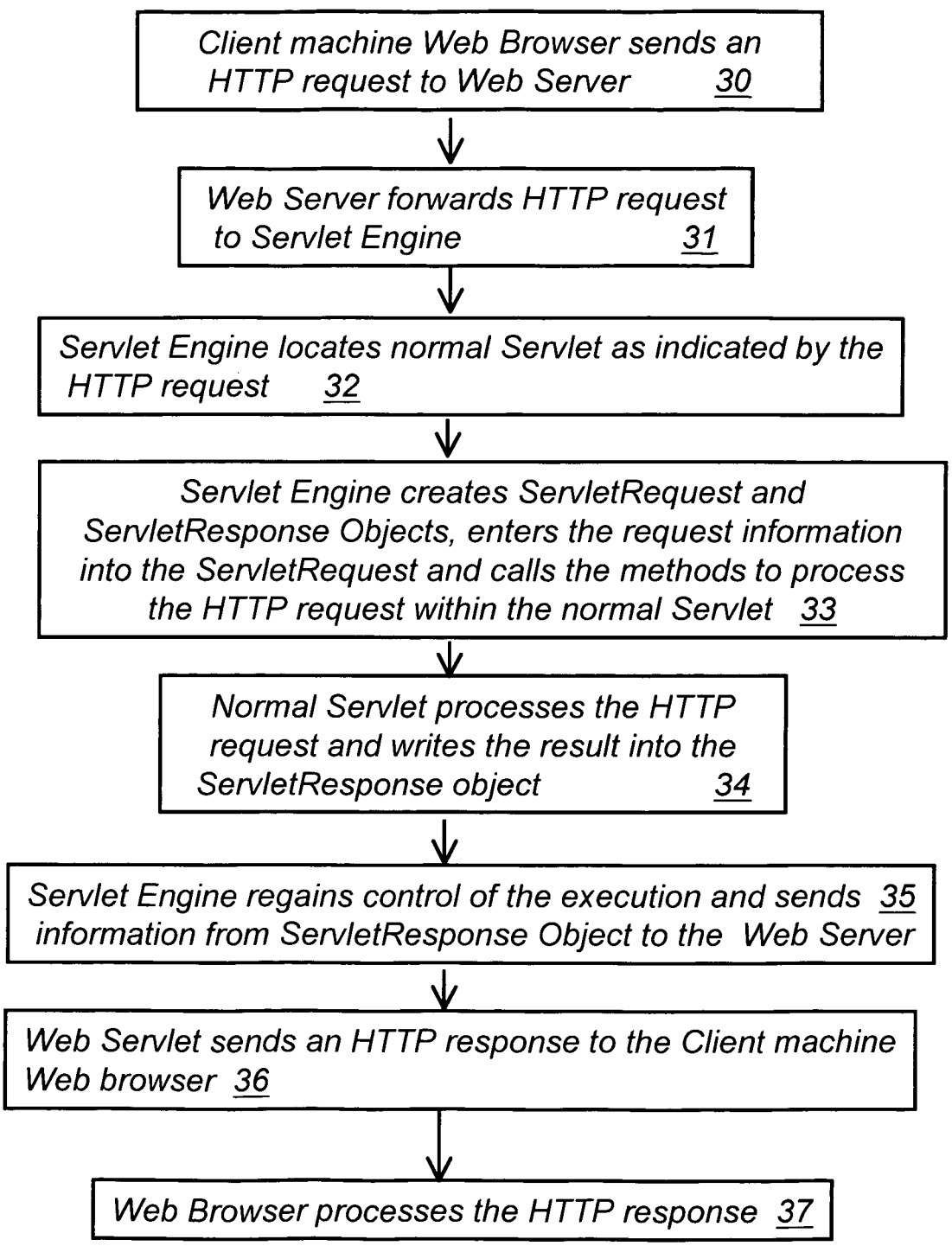
FIG. 9 is a flow diagram of a normal servlet operation.

Referring to FIG. 8 and FIG. 9, in operation the client machine browser 130 sends an HTTP request 142 to the web server 110 (30). The web server 110 forwards the HTTP request to the Java Servlet Engine 52 (31). The Java Servlet Engine 52 locates the normal Servlet 51 that was identified by the HTTP request and calls one of the above mentioned methods to process the HTTP request (32). When the method is called the Servlet Engine creates the ServletRequest and ServletResponse objects (33). The ServletRequest object contains all the information the client machine Web browser 130 sends to the web server 110. The ServletResponse object contains all the information that the web server 110 sends back to the web browser 130. The normal servlet 51 obtains the request information from the ServletRequest object and writes the results of the executed method into the ServletResponse object (34). After the normal servlet 51 finishes the execution of the requested method, the Servlet Engine 52 regains control of the execution and sends the ServletResponse object to the Web Server 110 (35). The Web Server 110 sends the ServletResponse to the client Web browser 130 (36) and the web browser 130 processes the response (37). This cycle repeats itself with the next HTTP request.

Figure 9A:
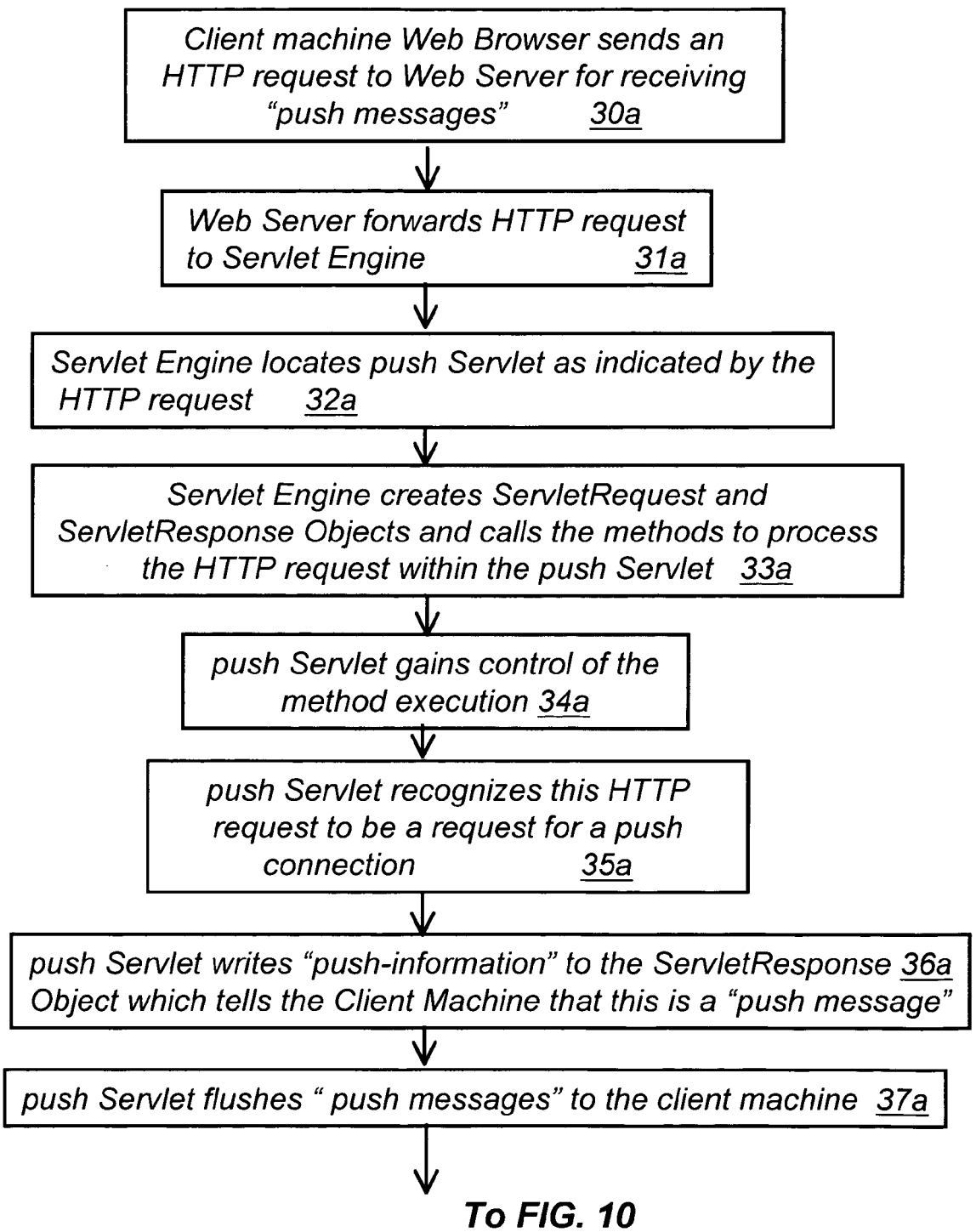
Figure 10:
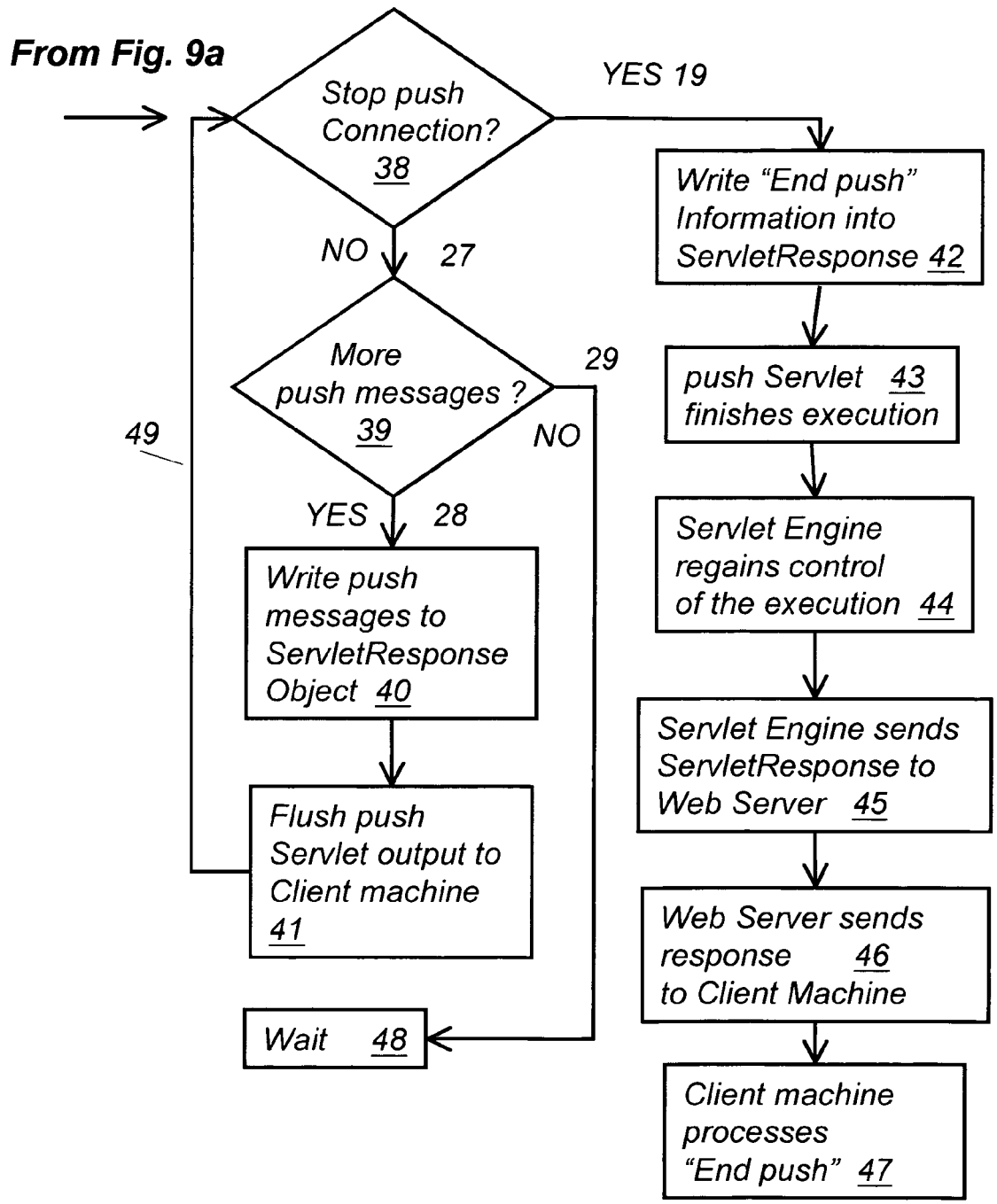

In order to perform "server push" that utilizes this Java Servlet methodology a specific push Servlet 50 is created and the process of FIG. 9A and FIG. 10 is applied. Referring to FIGS. 9A and 10, the client machine Web browser 130 sends an HTTP request to the web server 110 (30a). The HTTP request is a request for receiving "Server-push" messages and the URI of the message points to the push Servlet 50. The Web Server 110 receives this HTTP request and forwards it to the Java Servlet Engine 52 (31a). The Servlet Engine 52 receives the HTTP request and locates the indicated push Servlet 52 (32a). Next, the Servlet engine 52 creates the ServletRequest and ServletResponse objects and calls the methods to process the HTTP request within the push Servlet 50 (33a). The push Servlet gains control of the method execution (34a) and recognizes that this HTTP request is a request for "Server-push" and establishes a push connection (35a). The push Servlet 50 writes the requested "push-information" to the ServletResponse object and tells the client machine that this is a "push-connection" (36a). The push Servlet 50 flushes the "push-information" to the client machine (37a). This process continues following the loop shown in FIG. 10. The push Servlet asks "Stop push-connection?" (38). If the answer is NO (27) the next question is "Are there more push-messages" (39). If the answer is YES (28), the push Servlet writes the push-messages to the ServletResponse object (40) and flushes the output to the client machine (41). The loop then closes by going back to the "stop push-connection?" step (49). If the answer to the question "Are there more push-messages?" is NO (29) the push Servlet goes in the "wait" mode (48). If the answer to the question "Stop push-connection?" is YES (19), the push Servlet writes the push information into the ServletResponse (42) and it finishes the method execution (43). Next, the Servlet Engine 52 regains control of the execution (44) and sends the ServletResponse to the Web Server (45). The Web server sends the response to the client machine (46) and client machine processes the "end-push" method (47).

Step 36*a* where the push Servlet tells the client machine that this is a "push-connection" is accomplished by utilizing the previously described header structures, i.e., "multipart", "content-length" or "chunked". In one example the HTTP header is set to be a "multipart" response.

HTTP/1.1 200 OK content-type: multipart/mixed; boundary=a

--a

<part1>

--a

<part2>

--a

<part3>

--a-- (termination of multipart response)

In another example, the HTTP header "content-length" is set to be to a very large number, i.e., 5,000,000 bytes, or larger than the sum of the content length of all messages that the server wants to push to the client machine.

HTTP/1.1 200 OK content-type: text/html content-length: 5000000 bytes;

<html.<body> . . . <html>

In another example the HTTP header "transfer-encoding" is set to be "chunked" and the certain condition defines the end of the "chunked" response.

HTTP/1.1 200 OK content-type: text/html

Transfer-Encoding: chunked

Examples of cases where "push-messages" are requested include among others, real time updates of a stock price, real time security monitoring and update, or any other real time information update provided by a server to a client machine. Each HTTP request is processed within one communication thread. The process of FIG. 9*a* and FIG. 10 occurs within a first Java thread.

Figure 11:
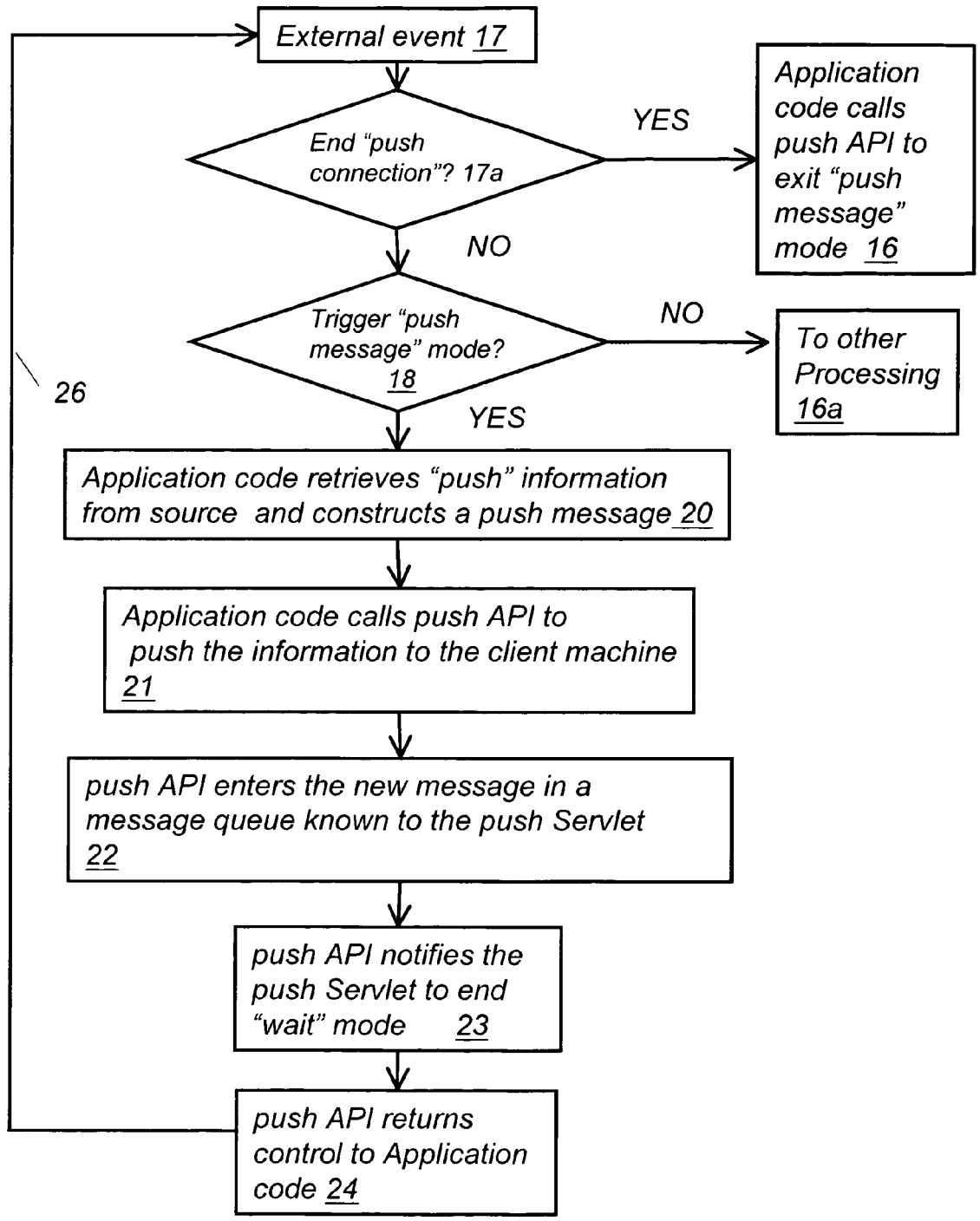
FIG. 11 is flow diagram of the "server-push" method that utilizes a push API.

A second process, shown in FIG. 11, occurs within a second Java thread that runs parallel to the first Java thread of FIG. 9A and FIG. 10. Referring to FIG. 11, an external event happens (17) which causes the system to decide whether to end the "push connection" or not (17*a*). If the condition for ending the "push connection is met the application code calls the push API to exit the "push message" mode (16). If the condition for ending the "push connection" mode is not met the system goes through the step of deciding whether to trigger the "push message" mode or not (18). If the condition is met for triggering the "push message" mode, the application code retrieves the "push" information, i.e., the stock price, from the information source and constructs a "push message" (20). Next, the application code calls the push servlet Application Program Interface(API) 53, shown in FIG. 8, to send the "push message" to the client machine(21). The push API enters the new "push message" in a message queue known to the push Servlet (22). Next the push API notifies the push Servlet to end the "wait" mode (23) and returns control to the application code (24). When a new external event happens the process repeats itself. If the condition for triggering the "push message" mode is not met, the system goes to other processing (16*a*).

Messaging reliability is achieved by using message queue and by attaching a unique identification (ID) to each message. Both the CRE 224 and the SRE 214 maintain their own message queue 221, 211, respectively, shown in FIG. 2. Whenever a message is delivered, a unique ID is attached to the message. The message is not removed from the message queue until an acknowledgement from the other party is received acknowledging the receipt of this particular message ID. If no acknowledgement is received after a certain period of time, the message will be delivered again. The receiving party receives messages and immediately sends an acknowledgement of the receipt of this message ID to the sending party. The received message ID is kept in memory for a certain period of time. If a message with the same ID is received again within this period of time, the new message is discarded. This avoids the same message being processed multiple times.

The unique message ID may also contain information about the order of the message in the message queue. In one example, the CRE 224 contain a first message and a second message in its message queue 221 and the first message is ordered after the second message. The unique message ID of the first message contains an indication that there is a second message and that the first message is ordered after the second message. When the SRE 214 receives the first message from the CRE it reads the message ID information and checks to see whether the indicated second message has been previously received by the SRE 214. If it determines that the second message has not been received yet, the SRE 214 sends a request to the CRE 224 to send the second message. If the second message has already been received the SRE 214 orders the two messages with the same order as they were in the CRE 224, i.e., the first message after the second message. This process is also valid for messages sent from the SRE 214 to the CRE 224. Also, the message queues 221, 211 may contain more than two messages that are ordered and the order will be replicated from the sender to the receiver and vice versa.

Other embodiments are within the scope of the following claims. For example, the SRE 214 may also run outside the application server 210. Examples of business applications that could be delivered over the described distributed web-based system 200 include among others Microsoft Word for word processing applications, Microsoft Excel for spreadsheet applications, financial trading software used by portfolio managers in financial institutions, and claim processing applications used in the insurance industry.

Several embodiments of the present invention have been described. Nevertheless, it will be understood that various modifications may be made without departing from the spirit and scope of the invention. Accordingly, other embodiments are within the scope of the following claims.

What is claimed is:

1. A method for providing "guaranteed message delivery" for network based communications between a client machine and a server, wherein said client machine comprises a Client Runtime Environment (CRE) and said server comprises a Server Runtime Environment (SRE), said method comprising:

maintaining a first message queue in said CRE;

attaching a first unique identification to a first message from said first message queue and sending said first message with said attached first unique identification from said CRE to said SRE via an http communication;

receiving said first message with said attached first unique identification by said SRE and sending an acknowledgement of said receipt of said first message with said attached first unique identification by said SRE to said CRE;

upon receiving of said acknowledgement by said CRE within a certain time threshold, removing said first message from said first message queue in said CRE;

maintaining a second message queue in said SRE;

attaching a second unique identification to a second message from said second message queue and sending said second message from said SRE to said CRE;

receiving said second message by said CRE and sending an acknowledgement of said receipt of said second message by said CRE to said SRE; and upon receiving of said acknowledgement by said SRE within a certain time threshold, removing said second message from said second message queue in said SRE.

2. The method of claim 1 wherein upon not receiving of said acknowledgement by said CRE within a certain time threshold, sending said first message again from said CRE to said SRE.

3. The method of claim 1 wherein upon not receiving of said acknowledgement by said CRE within a certain time threshold, raising an error condition in said CRE.

4. A method for providing "once-and-only-once message delivery" for network-based communications between a client machine and a server, wherein said client machine comprises a Client Runtime Environment (CRE) and said server comprises a Server Runtime Environment (SRE), said method comprising:

maintaining a first message queue in said CRE;

attaching a first unique identification to a first message from said first message queue and sending said first message with said attached first unique identification from said CRE to said SRE via an http communication;

receiving said first message with said attached first unique identification by said SRE and checking whether said first message with said first unique identification has been previously received by said SRE or not;

upon determining that said first message with said first unique identification has been previously received by said SRE, discarding said first message;

maintaining a second message queue in said SRE;

attaching a second unique identification to a second message from said second message queue and sending said second message from said SRE to said CRE;

receiving said second message by said CRE and checking whether said second message with said second unique identification has been previously received by said CRE or not and upon determining that said second message with said second unique identification has been previously received by said CRE, discarding said second message.

5. The method of claim 4 further comprising upon determining that said first message with said first unique identification has not been previously received by said SRE, maintaining said first message in said SRE.

6. The method of claim 4 further comprising upon determining that said second message with said second unique identification has not been previously received by said CRE, maintaining said second message in said CRE.

7. A method for providing "guaranteed order message delivery" for network based communications between a client machine and a server, wherein said client machine comprises a Client Runtime Environment (CRE) and said server comprises a Server Runtime Environment (SRE), said method comprising:

maintaining a first message queue in said CRE wherein said first message queue comprises at least a first message and a second message and said first message is ordered after said second message in said first message queue;

attaching a first unique identification to said first message wherein said first unique identification comprises a first indication that said first message is ordered after said second message;

sending said first message with said attached unique identification from said CRE to said SRE via an http communication;

receiving said first message with said attached unique identification by said SRE and checking whether said second message has been previously received by said SRE;

upon determining that said second message has not been received yet, sending a request to said CRE for sending said second message;

maintaining a second message queue in said SRE wherein said second message queue comprises at least a third message and a fourth message and said third message is ordered after said fourth message in said second message queue;

attaching a second unique identification to said third message wherein said second unique identification comprises a second indication that said third message is ordered after said fourth message;

sending said third message from said SRE to said CRE via said http communication;

receiving said third message by said CRE and checking whether said fourth message has been previously received by said CRE; and upon determining that said fourth message has not been received yet, sending a request to said SRE for sending said fourth message.

8. The method of claim 7 further comprising upon determining that said second message has been already received by said SRE placing said first message and said second message in a SRE message storage so that said first message is ordered after said second message.

9. The method of claim 7 further comprising upon determining that said fourth message has been already received by said CRE placing said third message and said fourth message in a CRE message storage so that said third message is ordered after said fourth message.

* * * * *